United States Patent
Bartfai et al.

(10) Patent No.: US 7,627,729 B2
(45) Date of Patent: Dec. 1, 2009

(54) APPARATUS, SYSTEM, AND METHOD FOR AN IMPROVED SYNCHRONOUS MIRROR SWAP

(75) Inventors: Robert Francis Bartfai, Tucson, AZ (US); Nicolas Marc Clayton, Warrington (GB); Shachar Fienblit, Ein Ayala (IL); Olympia Gluck, Haifa (IL); Eli Malul, Maafe Nof (IL); Gail Andrea Spear, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 328 days.

(21) Appl. No.: 11/470,970

(22) Filed: Sep. 7, 2006

(65) Prior Publication Data

US 2008/0065843 A1 Mar. 13, 2008

(30) Foreign Application Priority Data

Mar. 7, 2006 (JP) ............................... 2006-060433

(51) Int. Cl.
*G06F 12/00* (2006.01)
(52) U.S. Cl. ...................................... 711/162; 711/165
(58) Field of Classification Search ........................ None
See application file for complete search history.

(56) References Cited

U.S. PATENT DOCUMENTS

| | | | |
|---|---|---|---|
| 2003/0126107 A1 | 7/2003 | Yamagami et al. | 707/1 |
| 2004/0230859 A1 | 11/2004 | Cochran et al. | 714/2 |
| 2004/0260899 A1 | 12/2004 | Kern | |
| 2005/0081091 A1* | 4/2005 | Bartfai et al. | 714/6 |
| 2005/0193245 A1 | 9/2005 | Hayden et al. | 714/13 |

* cited by examiner

*Primary Examiner*—Reginald G Bragdon
*Assistant Examiner*—Eric Loonan
(74) *Attorney, Agent, or Firm*—Kunzler & McKenzie

(57) ABSTRACT

An apparatus, system, and method are disclosed for activating a synchronous mirror as a primary storage volume. The apparatus system and method include directing a third storage volume to store updates sent to the third storage volume from a second storage volume onto a first storage volume in response to the first storage volume becoming operational after a failure, terminating sending updates from the second storage volume to the third storage volume in response to the first storage volume becoming substantially consistent with the third storage volume, and synchronously storing updates received by the second storage volume on the first storage volume and asynchronously storing updates received by the first storage volume on the third storage volume in response to terminating sending updates from the second storage volume to the third storage volume after the first and third storage volumes are substantially consistent.

28 Claims, 12 Drawing Sheets

APPARATUS, SYSTEM, AND METHOD FOR AN IMPROVED SYNCHRONOUS MIRROR SWAP

BACKGROUND OF THE INVENTION

1. Field of the Invention

This invention relates to synchronous data mirrors and more particularly relates to efficiently swapping from a primary storage volume to a synchronous data mirror in system that includes an asynchronous data mirror.

2. Description of the Related Art

Data storage system users may require a high degree of reliability and quick recovery from failures. Some data storage system users may require protection from data loss due to natural disasters. For example, data storage system users such as financial institutions, retailers, and the like may demand a high degree of reliability for financial transactions, inventory control, etc. An enterprises storage system ("ESS"), such as the TotalStorage® Enterprise Storage Server® from IBM®, may be used by financial institutions and others to store data where reliability is important. Such systems may include highly scalable data storage devices organized into a data storage volume, such as a redundant array of inexpensive/independent disks ("RAID").

A data storage system may include a storage area network ("SAN") connecting data storage volumes. Typically a storage controller is used to access data storage volumes over the SAN. A host typically sends write requests to a storage controller which stores the data on a local, primary storage volume. In a cascaded data system arrangement, the storage controller also sends the data stored on the primary storage volume to a storage controller of a secondary data storage volume. Data storage volumes may be also located a long distance from the primary storage volume and associated storage controller to allow recovery after a natural disaster that affects the primary storage volume. Data storage volumes may also be relatively close to the primary storage volume, which reduces data access rates.

To minimize recovery time after a failure, a secondary storage volume may be a mirror of the primary data volume. Data may be written to the mirror data volume using a synchronous write operation. Typically, a synchronous write operation requires that data be written to the primary storage volume and the mirror data volume before success is returned to a host requesting the write operation. A synchronous write operation requires more overhead due to the time required to successfully write data to a primary storage volume and to the mirror storage volume.

Typically, distance between the primary storage volume and the mirror data volume affects performance so that data storage volumes located a long distance from the primary storage volume and associated storage controller may degrade performance enough to make synchronous write operations impractical. Asynchronous write operations may be used to write data to a remote data volume. An asynchronous write operation typically allows success to be returned for a write operation after the data is successfully written to the storage volume where the write operation is directed. The data is then written to the remote storage volume after completion of writing data to the storage volume storage where the write operation is directed.

In a cascaded storage system, data may be written to a primary storage volume and synchronously to a mirror data volume. The data is then copied asynchronously from the mirror data volume to a remote data volume. Data intended for storage in a remote storage volume typically is stored in a non-volatile memory, or write cache as well as in the general cache of a storage controller so that the data is not lost if an error occurs before the data can be asynchronously written to the remote storage volume.

One or more bit maps are typically used to track data to be written asynchronously to a remote storage volume. An array of bits, often referred to as an active track array, changed track array, or change recording ("CR") bitmap, typically is used to keep a real-time record by track address on the storage volume initiating the asynchronous transfer of changes made since the last synchronization, or last time the storage volume initiating the asynchronous transfer and the remote storage volume were consistent. A second bitmap, sometimes called a recovery track array, a copy track array, or out of sync ("OOS") bitmap, is used to designate which tracks have been written to the primary storage volume as part of an asynchronous write operation and still need to be copied to the remote storage volume.

Typically, as updates are successfully written to the remote storage volume, corresponding bits of the OOS bitmap are cleared. In one embodiment, contents of the CR bitmap are periodically merged with the OOS bitmap. In another embodiment, contents of the CR bitmap are periodically written over the OOS bitmap, typically when the OOS bitmap indicates there are no more updates to be written to the remote storage volume.

A common data storage system architecture 100 is depicted in FIG. 1A. The data storage system 100 is embodied by a host 102 that sends data to a first storage controller 104 of a first storage volume 106. The first storage volume 106 is initially designated as a primary storage volume and receives data from the first storage controller 104 over a local connection 108. A second storage volume 110 is a mirror data volume of the primary storage volume and receives data over a synchronous connection 112 through an associated second storage controller 111. In one embodiment, the synchronous connection 112 is a Metro Mirror connection. Typically the first storage controller 104 and first storage volume 106 are located at a local site, but may also be separated by some distance.

Updates received by the second storage volume 110 are also written to a third storage volume 114, typically located remotely from the first and second storage volumes 106, 110. Updates are asynchronously sent to the third storage volume 114. The second and third storage volumes 110, 114 communicate over a connection 116 that may include fiber optic cables, copper cables, a wireless connection, etc. In one embodiment, the asynchronous connection 116 is a Global Mirror connection. A fourth storage volume 118, in one embodiment, is located with the third storage volume 114. A third storage controller 120 facilitates copying data to the third storage volume 114 and from the third storage volume 114 to the fourth storage volume 118. Typically, the third storage controller 120 copies updates to the fourth storage volume 118 using a flash copy process 122 and updates are assembled in a chronological order on the fourth storage volume 118.

Typically, the fourth storage volume 118, if present in the storage system 100, is used to restore data to the first or second storage volume 106, 110 if data is lost, corrupted, or inaccessible. In one embodiment, the contents of the fourth storage volume 118 are used to bring the third volume to a synchronous state with the third storage volume 114 and the third storage volume 114 is used to reinitialize the first and/or second storage volumes 106, 110. Replacing the data on the first or second storage volumes 106, 110, rather than incrementally synchronizing the storage volumes 106, 110, 118 is undesirable due to the time required for the copy process and the time that the storage volumes 106, 110, 118 are inaccessible to the host 102.

The second storage volume 110 may have an associated CR bitmap 124 to track updates that happened after a time when the first and second storage volumes 106, 110 are consistent. The second storage volume 110 may also have an associated OOS bitmap to track when updates intended to be asynchronously copied to the third storage volume 114 are successfully copied. The OOS bitmap typically tracks updates by receiving the contents of the CR bitmap or updates received by the second storage volume 110.

FIG. 1B depicts a situation with a failure on the first storage volume 106. The host 102 typically swaps the primary storage volumes so that the second storage volume 110 is the primary storage volume until the first storage volume 106 is repaired. The host 102 typically establishes a connection 128 with the second storage volume 110. When the first storage volume 106 is repaired, as depicted in FIG. 1C, the second storage controller 111 of the second storage volume 110 typically suspends updates to the third storage volume 114 and establishes a connection 130 with the first storage volume 106 to resynchronize. In one embodiment, establishing a connection 130 to send data from the second storage volume 110 to the first storage volume 106 is a failover connection.

Once the first storage volume 106 is consistent with the second storage volume 110, as depicted in FIG. 1D, the host 102 swaps the primary storage volume to be the first storage volume 106 and the first storage volume 106 reestablishes the synchronous connection 112 with the second storage volume 110. In one embodiment, reestablishing sending data from the first storage volume 106 to the second storage volume 110 is a failback connection. The second storage volume 110 starts to again send updates asynchronously to the third storage volume 114, which begins to update the fourth storage volume 118. Failover and failback connections require pre-existing relationships, such as the storage relationship between the first storage volume 106 and the second storage volume 110.

During the time when the second storage volume 110 is synchronizing with the first storage volume 106 and has suspended updates to the third storage volume 114 (see FIG. 1C), the third and fourth storage volumes 114, 118 begin to age. If the first storage volume 106 was not operational for a long period of time, the third and fourth storage volumes 114, 118 could require a long time to be brought to a consistent state with the first and second storage volumes 106, 110. The process of re-synchronizing the first, third, and fourth storage volumes 106, 114, 118 could take hours or even days. Any disaster that requires the contents of the third storage volume 114 to be reloaded onto the first or second storage volume 106, 110 before the third storage volume 114 is brought to a nearly consistent state is problematic because the third storage volume 114 is not close to being consistent.

From the foregoing discussion, it should be apparent that a need exists for an apparatus, system, and method that efficiently swap synchronous mirror volumes. Beneficially, such an apparatus, system, and method would re-synchronize a first storage volume 106 while maintaining the second, third, and fourth storage volumes 110, 114, 118 in a nearly synchronous state and would decrease the time required to resynchronize the system 100. The apparatus, system, and method would force a failover between storage volumes where no pre-existing storage relationship existed previously.

SUMMARY OF THE INVENTION

The present invention has been developed in response to the present state of the art, and in particular, in response to the problems and needs in the art that have not yet been fully solved by currently available mirror swapping methods. Accordingly, the present invention has been developed to provide an apparatus, system, and method for activating a synchronous mirror as a primary storage volume that overcome many or all of the above-discussed shortcomings in the art.

A method of the present invention is presented for activating a synchronous mirror as a primary storage volume. The method in the disclosed embodiments substantially includes the steps necessary to carry out the functions presented below with respect to the operation of the described apparatus and system. In one embodiment, the method includes directing a third storage volume to store updates sent to the third storage volume from a second storage volume onto a first storage volume in response to the first storage volume becoming operational after a failure. The method includes terminating sending updates from the second storage volume to the third storage volume in response to the first storage volume becoming substantially consistent with the third storage volume. The method includes synchronously storing updates received by the second storage volume on the first storage volume and asynchronously storing updates received by the first storage volume on the third storage volume in response to terminating sending updates from the second storage volume to the third storage volume after the first and third storage volumes are substantially consistent.

The method also may include designating the second storage volume as a primary storage volume in response to detecting the failure at the first storage volume. The first storage volume is designated as the primary storage volume, the second storage volume comprises a synchronous mirror copy of the first storage volume's data, and the third storage volume comprises an asynchronous mirror copy of the second storage volume's data prior to the failure. In a further embodiment, the method includes terminating a storage relationship on the second storage volume. The storage relationship comprises information the second storage volume uses to synchronously store data from the first storage volume.

In an alternate embodiment, the method includes designating the first storage volume as the primary storage volume in response to synchronously storing updates received by the second storage volume on the first storage volume and asynchronously storing updates received by the first storage volume on the third storage volume. The method of the alternate embodiment includes directing the third storage volume to store updates sent to the third storage volume from the first storage volume onto the second storage volume in response to the first storage volume being designated as the primary storage volume. The method of the alternate embodiment includes terminating sending updates from the first storage volume to the third storage volume in response to the second storage volume becoming substantially consistent with the third storage volume. The method of the alternate embodiment includes synchronously storing updates received by the first storage volume on the second storage volume and asynchronously storing updates received by the second storage volume on the third storage volume in response to terminating sending updates from the first storage volume to the third storage volume.

In one embodiment, directing the third storage volume to store updates sent to the third storage volume from the second storage volume onto the first storage volume further includes directing the third storage volume to create a storage relationship and to track updates subsequently received by the third storage volume. The storage relationship comprises information the third storage volume uses to asynchronously store updates on the first storage volume. In another embodiment, terminating sending updates from the second storage volume to the third storage volume further includes removing a storage relationship from the second storage volume and the third storage volume. The storage relationship comprises information the second storage volume uses to store data on the third storage volume. In another embodiment, terminating sending updates from the second storage volume to the third storage volume further includes tracking updates received by the second storage volume after termination of sending updates from the second storage volume to the third storage volume.

In one embodiment, asynchronous storing updates on the third storage volume further includes updating a fourth storage volume of the third storage volume using a flash copy process, wherein updates are chronologically organized on the fourth storage volume. Typically, the fourth storage volume comprises data suitable for reinitializing a primary storage volume or restoring the third volume. In one embodiment, terminating sending updates from the second storage volume to the third storage volume further includes terminating updates to the fourth storage volume. In another embodiment, asynchronously storing updates received by the first storage volume on the third storage volume further includes restarting updates to the fourth storage volume.

In one embodiment, asynchronously storing updates received by the first storage volume on the third storage volume further includes tracking updates received by the first storage volume to be copied to the third storage volume. The storage relationship includes information the first storage volume uses to asynchronously store updates on the third storage volume. In another embodiment, synchronously storing updates received by the second storage volume on the first storage volume further includes directing the second storage volume to create a storage relationship on the second storage volume. The storage relationship includes information the second storage volume uses to synchronously store data on the first storage volume.

An apparatus to activate a synchronous mirror as a primary storage volume is also provided with a plurality of modules configured to functionally execute the necessary steps of synchronizing a repaired first storage volume from a third storage volume while maintaining updates to the second and third storage volumes. These modules in the described embodiments include a primary swap module that designates a second storage volume as a primary storage volume in response to detecting a failure at a first storage volume. The first storage volume is designated as the primary storage volume, the second storage volume comprises a synchronous mirror copy of the first storage volume's data, and a third storage volume comprises an asynchronous mirror copy of the second storage volume's data prior to the failure.

The apparatus includes a C-A failback module that directs the third storage volume to store updates sent to the third storage volume from the second storage volume onto the first storage volume in response to the first storage volume becoming operational after the failure. The apparatus includes a B-C termination module that terminates sending updates from the second storage volume to the third storage volume in response to the first storage volume becoming substantially consistent with the third storage volume. The apparatus includes a B-A-C storage module that synchronously stores updates received by the second storage volume on the first storage volume and asynchronously stores updates received by the first storage volume on the third storage volume in response to the B-C termination module terminating sending updates from the second storage volume to the third storage volume.

The apparatus, in one embodiment, is configured to include a C-A forced failover module that directs the third storage volume to create a storage relationship and to track updates received by the third storage volume subsequent creation of the storage relationship. The storage relationship includes information the third storage volume uses to asynchronously store updates on the first storage volume. In another embodiment, the primary swap module is further includes an A-B termination module configured to terminate a storage relationship on the second storage volume and on the third storage volume in response to detecting a failure at the first storage volume and making the second storage volume a primary storage volume. The storage relationship includes information the second storage volume uses to synchronously store data from the first storage volume.

In one embodiment, the B-C termination module is further configured to remove a storage relationship from the second storage volume. The storage relationship includes information the second storage volume uses to store data on the third storage volume. In another embodiment, the B-C termination module further includes a track changes module configured to track updates received by the second storage volume after termination of sending updates from the second storage volume to the third storage volume.

The apparatus includes, in one embodiment, a fourth storage volume and the third storage volume is configured to store updates to the fourth storage volume using a flash copy process. The updates are chronologically organized on the fourth storage volume. In one embodiment, the B-C termination module is further configured to terminate updates to the fourth storage volume. In another embodiment, the B-A-C storage module is further configured to restart updates to the fourth storage volume.

In one embodiment, the B-A-C storage module further includes an A-C tracking module that directs the first storage volume to track updates received by the first storage volume to be copied to the third storage volume. In another embodiment, the B-A-C storage module further includes a B-A incremental resync module that directs the second storage volume to create a storage relationship on the second storage volume. The storage relationship includes information the second storage volume uses to synchronously store data on the first storage volume.

A system of the present invention is also presented to activate a synchronous mirror as a primary storage volume. The system may be embodied by a first storage volume designated as a primary storage volume prior to a failure of the first storage volume, a second storage volume comprising a synchronous mirror copy of the first storage volume's data prior to the failure, a third storage volume comprising an asynchronous mirror copy of the second storage volume's data prior to the failure, and a host configured to store updates to the first storage volume and the second storage volume. In particular, the host, in one embodiment, includes a primary swap module that designates the second storage volume as the primary storage volume in response to detecting the failure at the first storage volume. The host includes a C-A failback module that directs the third storage volume to store updates sent to the third storage volume from the second storage volume onto the first storage volume in response to the first storage volume becoming operational after the failure.

The host includes a B-C termination module that terminates sending updates from the second storage volume to the third storage volume in response to the first storage volume becoming nearly consistent with the third storage volume. The host includes a B-A-C storage module that synchronously stores updates received by the second storage volume on the first storage volume and asynchronously stores updates received by the first storage volume on the third storage volume in response to terminating sending updates from the second storage volume to the third storage volume. The system may further include a fourth storage volume located with the third storage volume, where the third storage volume is configured to store updates to the fourth storage volume using a flash copy process and the updates are chronologically organized on the fourth storage volume.

A method of the present invention is presented for creating a new storage relationship on a storage volume. The method in the disclosed embodiments substantially includes the steps necessary to carry out the functions presented above with respect to the operation of the described apparatus and system. In one embodiment, the method includes creating a storage relationship on a first storage volume. The storage relationship includes information used by the first storage volume to store updates received by the first storage volume to a second storage volume and the first storage volume lacks an existing storage relationship with the second storage volume. The method includes tracking updates to the first storage volume in a data structure from the time the storage relationship is created. The updates are intended to be copied to the second storage volume. The method includes copying the updates from the first storage volume to the second storage volume based on the tracked updates in the data structure. In one embodiment, storage relationship is a first storage relationship and the first storage volume has an existing second storage relationship with a third storage volume. In another embodiment, the storage relationship is created without reinitializing the first storage volume.

A method of the present invention is presented for deploying software to activate a synchronous mirror as a primary storage volume. The method in the disclosed embodiments substantially includes the steps necessary to carry out the functions presented below with respect to the operation of the described apparatus and system. In one embodiment, the method includes determining customer synchronous mirror and asynchronous mirror configuration and reliability requirements and executing a synchronous mirror activation computer code. The computer code is configured to designate a second storage volume as a primary storage volume in response to detecting a failure at a first storage volume. The first storage volume is designated as the primary storage volume, the second storage volume comprises a synchronous mirror copy of the first storage volume's data, and a third storage volume comprises an asynchronous mirror copy of the second storage volume's data prior to the failure.

The computer code is configured to direct the third storage volume to store updates sent to the third storage volume from the second storage volume onto the first storage volume in response to the first storage volume becoming operational after the failure. The computer code is configured to terminate sending updates from the second storage volume to the third storage volume in response to the first storage volume becoming substantially consistent with the third storage volume. The computer code is configured to synchronously store updates received by the second storage volume on the first storage volume and asynchronously store updates received by the first storage volume on the third storage volume in response to terminating sending updates from the second storage volume to the third storage volume after the first and third storage volumes are substantially consistent.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1A:
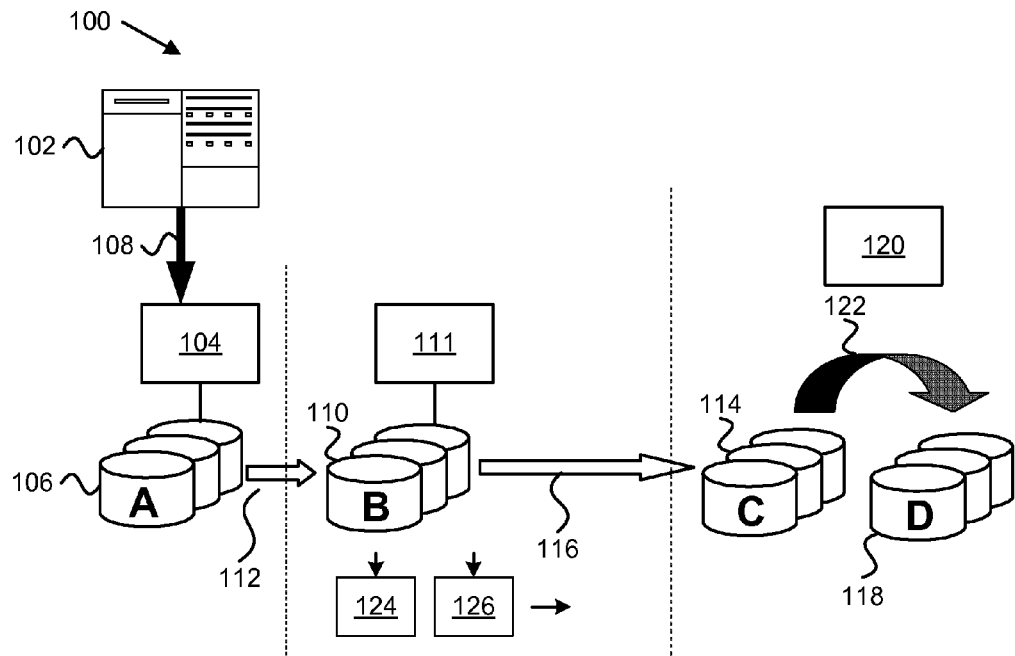
FIG. 1A is a schematic block diagram illustrating one embodiment of a typical three site data storage system prior to a primary storage volume failure.
Figure 1B:
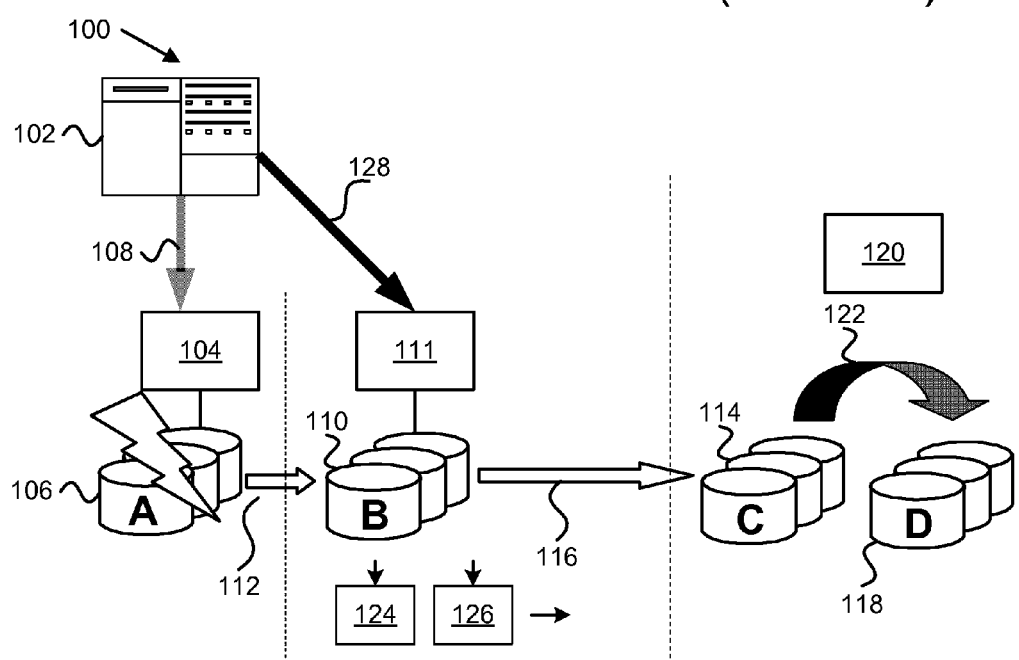
FIG. 1B is a schematic block diagram illustrating one embodiment of a typical three site data storage system after a primary storage volume failure where a second storage volume becomes the primary storage volume.
Figure 1C:
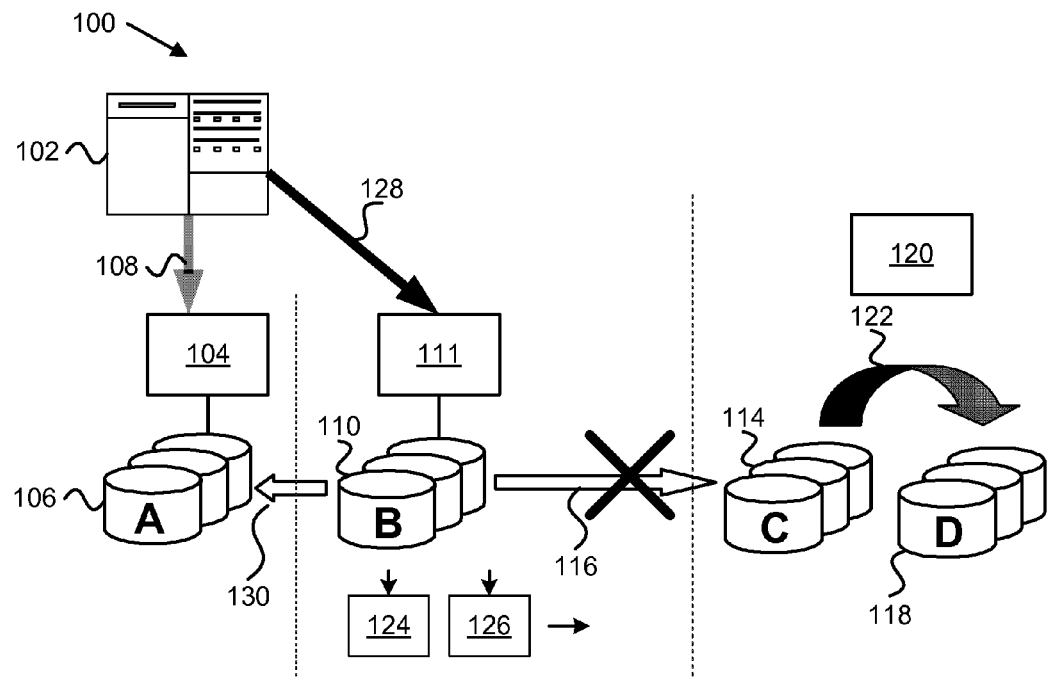
FIG. 1C is a schematic block diagram illustrating one embodiment of a typical three site data storage system depicting resynchronization of a first storage volume while suspending updates to a third storage volume.
Figure 1D:
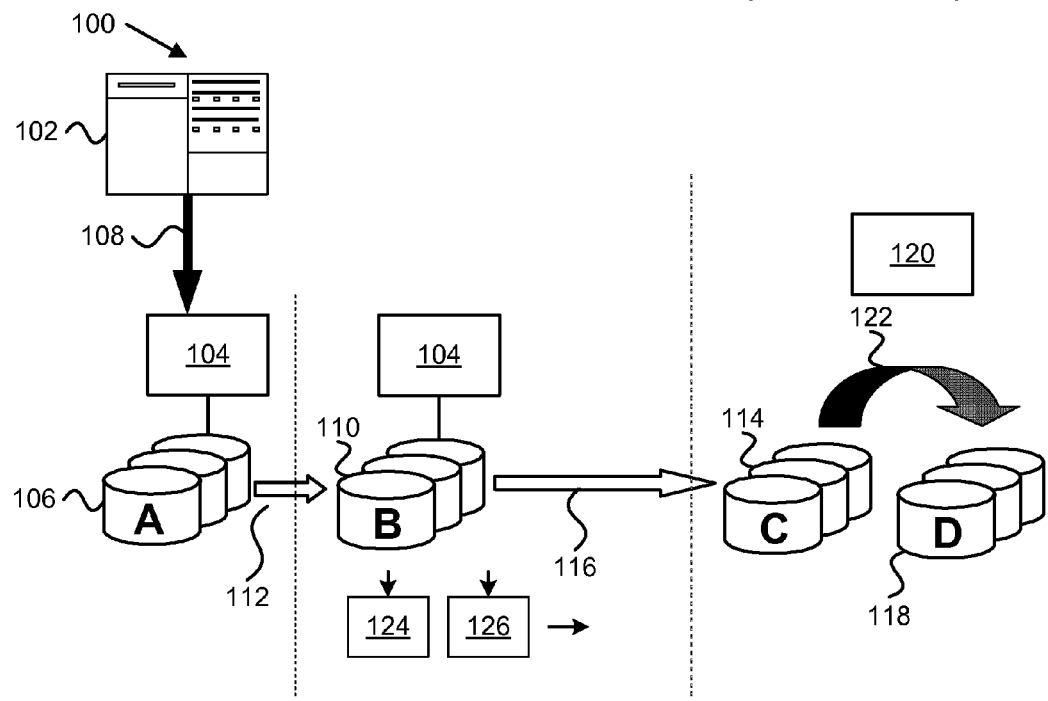
FIG. 1D is a schematic block diagram illustrating one embodiment of a typical three site data storage system after re-establishing the first storage volume as the primary, re-establishing synchronous updates to the second storage volume and asynchronous updates to the third storage volume.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. Where a module or portions of a module are implemented in software, the software portions are stored on one or more computer readable media. A computer readable medium may take any form capable of storing machine-readable instructions executable on a digital processing apparatus.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a signal bearing medium may take any form capable of generating a signal, causing a signal to be generated, or causing execution of a program of machine-readable instructions on a digital processing apparatus. A signal bearing medium may be embodied by a transmission line, a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 2:
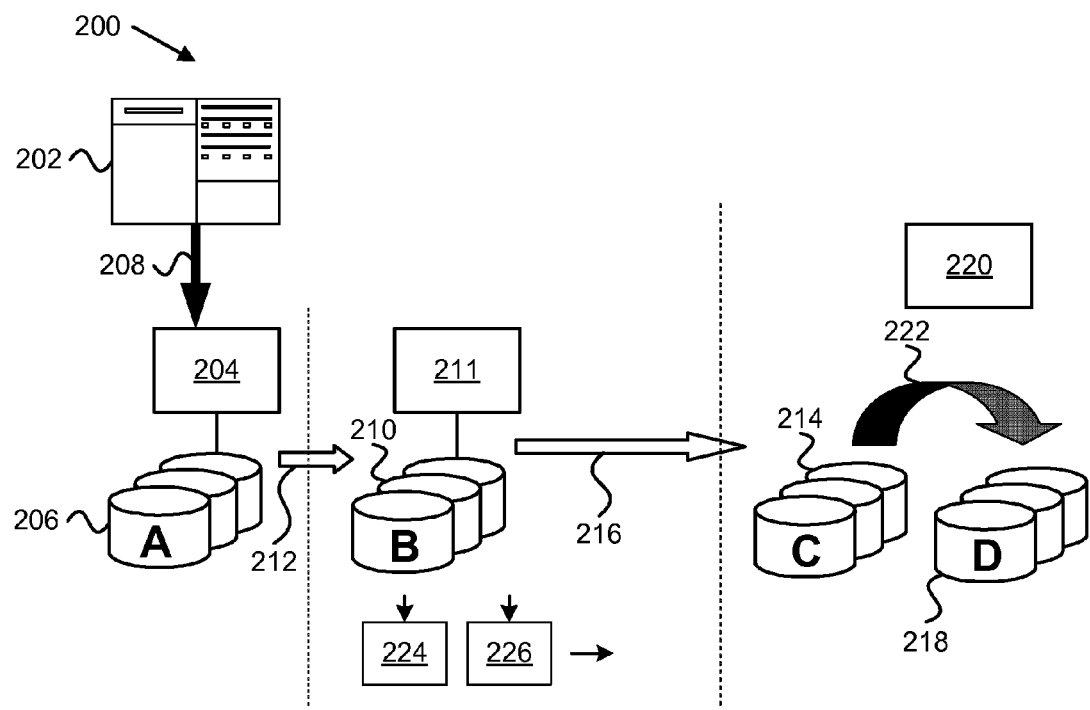
FIG. 2 is a schematic block diagram illustrating one embodiment of a data system for an improved synchronous mirror swap in accordance with the present invention prior to a primary storage volume failure.

FIG. 2 is a schematic block diagram illustrating one embodiment of a data system 200 for an improved synchronous mirror swap in accordance with the present invention prior to a primary storage volume failure. The data system 200 includes a host 202, a first storage controller 204, a first storage volume 206, a connection 208 between the host 202 and the first storage controller 204, a second storage volume 210, a second storage controller 211, a synchronous connection 212 between the first and second storage volumes 206, 210, a third storage volume 214, an asynchronous connection 216 between the second and third storage volumes 210, 214, a fourth storage volume 218, a third storage controller 220, a connection 222 between the third and fourth storage volumes 214, 218, and a CR bitmap 224 and an OOS bitmap 226 associated with the second storage volume 210, which are described below. In one embodiment, the components of the data system 200 are similar to the data storage system 100 described in relation to FIG. 1A except that the data system 200 includes modules, components, connections, etc. for an improved synchronous mirror swap in accordance with the present invention.

The data system 200 includes one or more hosts 202 that send write requests to a storage controller 204, 211, 220. The host 202 is typically a server, but may be a workstation, a personal computer, a laptop computer, and the like. In one embodiment, the host 202 includes a network of computers, servers, printers, routers, etc. In another embodiment, the host 202 is combined with the first storage controller 204. The host 202 communicates with a storage controller 204, 211, 220 typically over a SAN, but may communicate over a local area network, a wide area network, the Internet, a wireless network, etc. The host 202 may also be configured to send read requests, copy requests, or other data related requests to a storage controller 204, 211, 220. One of skill in the art will recognize other embodiments of a host 202 capable of sending a data write request to a storage controller 204, 211, 220.

The data system 200 includes a first storage controller 204 configured to receive write requests from a host 202 and to store files, updates to files, file information, etc. (hereinafter "updates") to one or more storage volumes 206, 210, 214, 218. In one embodiment, the first storage controller 204 is an enterprise storage system ("ESS") controller. In another embodiment, the first storage controller 204 is a IBM System Storage® DS8000® storage server. The first storage controller 204 may be a server, a workstation, a data mover, or a system of multiple components and computers. Typically, the first storage controller 204 includes non-volatile memory or write cache along with volatile memory or cache for temporarily storing updates. One of skill in the art will recognize other first storage controller 204 configurations capable of receiving a write request from a host 202 and storing updates related to the write request on a storage volume 206, 210, 214, 218.

The system 200 includes a first storage volume 206 that stores updates received from a first storage controller 204. Typically, under normal operating conditions the first storage volume 206 is designated as a primary storage volume and receives updates directly from the first storage controller 204. The first storage volume 206 includes at least one hard disk drive ("HDD"), but may also include an array of disks that together form a volume. The first storage volume 206 may include a RAID array, Just a Bunch of Disks ("JBOD"), and the like. The first storage volume 206 may include tape drives, optical drives, and the like. In one embodiment, the first storage volume 206 includes one disk or an array of disks forming one volume. In another embodiment, the first storage volume 206 includes a plurality of storage volumes.

Typically, the one or more storage volumes of the first storage volume 206 are accessible to the first storage controller 204. The first storage volume 206, in one embodiment, includes a data mover, controller, or other device with a processor and memory to control the one or more storage volumes of the first storage volume 206 and to receive updates from the first storage controller 204, or another storage controller. One of skill in the art will recognize other first storage volumes 206 capable of receiving an update from a first storage controller 204.

The system 200 includes a data connection 208 from the host 202 to the first storage controller 204. The host 202 communicates with the storage controllers 204, 211, 220 over connection 208 that typically includes a SAN, but may include a fiber connection, a small computer system interface ("SCSI"), local area network, routers, switches, and the like. In a cascaded data storage system 200, typically when the first storage volume 206 is designated as a primary storage volume, the first storage controller 204 sends updates from the host 202 directly to the first storage volume 206, rather than through the second or third storage volumes 210, 214.

The data system 200 includes a second storage volume 210 substantially similar to the first storage volume 206. Typically, the second storage volume 210 is initially a synchronous mirror data volume of the first storage volume 206 and includes the same data as the first storage volume 206. Typically, the second storage volume 210 has the same capacity, the same number of tracks, etc. as the first storage volume 206. The second storage volume 210 may be located at an intermediate site that is close enough to the first storage volume 206 to allow a connection that accommodates a synchronous connection 212 without unacceptable performance degradation. The second storage volume 210, in one embodiment, is located with the first storage volume 206.

The data system 200 includes a data connection 212 between the first storage volume 206 (through the associated first storage controller 204) to the second storage volume 210 (through the associated second storage controller 211). The data connection 212 is substantially similar to the host 202 to first storage controller 204 connection 208. The data connection 212 is capable of a synchronous connection between the first and second storage volumes 206, 210. The data system 200 includes a second storage controller 211 associated with the second storage volume 210 and substantially similar to the first storage controller 204.

The system 200 includes a third storage volume 214 and a fourth storage volume 218 typically located remotely from the first and second storage volumes 206, 210. The system 200 includes a third storage controller 220 associated with the third and forth storage volumes 214, 218 and substantially similar to the first and second storage controllers 204, 211. The third storage volume 214 initially receives updates asynchronously from the second storage volume and controller 210, 211. The third storage controller 220, during an asynchronous operating mode, copies the updates received by the third storage volume 214 onto the fourth storage volume 218 using a flash copy process 222. The third storage controller 220 typically rearranges updates copied to the fourth storage volume 218 in a chronological order based on points in time when the third storage volume 214 was consistent with the second storage volume 210, or other suitable significant points in time.

The system 200 includes a data connection 216 between the second and third storage volumes 210, 214 (and associated controllers 211, 220). The data connection 216 may be wide area network connection, fiber network connection, etc. and may include fiber optic cable, copper cable, a wireless connection, hubs, routers, and the like. The third and forth storage volumes 214, 218 are typically located remotely from the first and second storage volumes 206, 210 so that the data connection 216 between the second and third storage volumes 210, 214 are suitable for such distances.

The system 200 includes a CR bitmap 224 and an OOS bitmap 226 associated with the second storage volume 210. The bitmaps 224, 226 are typically data storage and managed by the second storage controller 211. The CR bitmap 224, in one embodiment, tracks updates to the second storage volume 210 occurring after synchronization with the third storage volume 214 when the volumes were consistent. The OOS bitmap tracks updates to be written to the third storage volume 214. Typically both bitmaps 224, 226 identify track addresses of updates to the storage volumes 210, 214.

For example, periodically the contents of the CR bitmap 224 are merged with the OOS bitmap 226 after the OOS bitmap 226 is drained. When the OOS bitmap 226 is drained, the second and third volumes 210, 214 are considered consistent, or synchronized. The OOS bitmap 226 is drained by copying the updates tracked by the OOS bitmap 226 to the third storage volume 214. As updates are written from the second storage volume 210 to the third storage volume 214, the bits associated with the copied update are cleared from the OOS bitmap 226. The CR bitmap 224 tracks changes that occur after the point in time when the second and third storage volumes 210, 214 are consistent. The OOS bitmap 226 may also track updates received by the second storage volume 210. In one embodiment, the CR bitmap 224 is copied to the OOS bitmap 226 after the OOS bitmap 226 is completely cleared. The CR bitmap 224 may also be cleared to track subsequent updates after its contents are copied or merged with the OOS bitmap 226.

Figure 3:
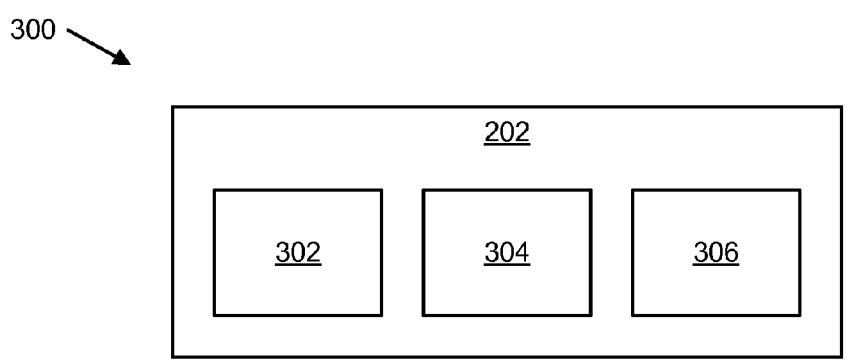
FIG. 3 is a schematic block diagram illustrating one embodiment of an apparatus for an improved synchronous mirror swap in accordance with the present invention.

FIG. 3 is a schematic block diagram illustrating one embodiment of an apparatus 300 for an improved synchronous mirror swap in accordance with the present invention. The apparatus 300 includes a host 202 with a C-A failback module 302, a B-C termination module 304, and a B-A-C storage module 306, which are described below. In one embodiment, the modules 302, 304, 306 of the apparatus 300 are included with the host 202. In another embodiment, the modules 302, 304, 306 of the apparatus 300 are included in a storage management computer (not shown). In yet another embodiment, the modules 302, 304, 306 of the apparatus 300 are included in a storage controller 204, 211, 220. One of skill in the art will recognize other locations for the modules 302, 304, 306 of the apparatus 300 to activate a synchronous mirror.

The apparatus 300 includes a C-A failback module 302 that directs the third storage volume 214 to store updates sent to the third storage volume 214 from the second storage volume 210 onto the first storage volume 206 in response to the first storage volume 206 becoming operational after a failure. After a failure of the first storage volume 206, the second storage volume 210 may be designated as the primary storage unit and the host 202 may send updates to the second storage volume 210. The second storage volume 210, typically, continues to send updates to the third storage volume 214. The third storage volume 214 tracks the changes in an OOS bitmap while the first storage volume 206 is not operational. The C-A failback module 302 recognizes that the first storage volume 206 is operational and begins to send updates to the first storage volume 206 tracked by the OOS bitmap associated with the third storage volume 214. In one embodiment, the updates are sent asynchronously. In another embodiment, the updates are sent synchronously.

The apparatus 300 includes a B-C termination module 304 that terminates sending updates from the second storage volume 210 to the third storage volume 214 in response to the first storage volume 206 becoming substantially consistent with the third storage volume 214. After the first storage volume 206 starts receiving updates from the third storage volume 214, the first storage volume 206 eventually reaches a point where it is nearly consistent with the third storage volume 214. In one embodiment, the B-C termination module 304 terminates sending updates when the first and third storage volumes 206, 214 are consistent. In another embodiment, the B-C termination module 304 terminates sending updates when the first and third storage volumes 206, 214 are substantially consistent. The later embodiment is preferred when the C-A failback module 302 sends updates to the first storage volume 206 asynchronously. In one embodiment, the B-C termination module 304 terminates updates to the fourth storage volume 218.

The apparatus 300 includes a B-A-C storage module 306 that synchronously stores updates received by the second storage volume 210 on the first storage volume 206 and asynchronously stores updates received by the first storage volume 206 on the third storage volume 214 in response to terminating sending updates from the second storage volume 210 to the third storage volume 214 after the first and third storage volumes 206, 214 are substantially consistent. In one embodiment, the B-A-C storage module 306 restarts updates to the fourth storage volume 218. Beneficially, the B-A-C storage module 306 restores the data storage system 200 to a state where updates can flow from the host 202 to a primary storage volume (second storage volume 210), synchronously to a mirror data volume (first storage volume 206), and then asynchronously to a remote storage volume (third and forth storage volumes 214, 218).

The apparatus 300 overcomes many of the disadvantages of the prior art system (see FIGS. 1A to 1D). The apparatus 300 maintains data flow from the host 202 to a primary storage volume (second storage volume 210) while also substantially maintaining data flow to the remote storage volumes (third and fourth storage volumes 214, 218) while the failed storage volume (first storage volume 206) is brought back online and synchronized. The apparatus 300 may also be used to repeat the method associated with the apparatus 300 to restore the first storage volume 206 as the primary storage volume and the second storage volume 210 as the mirror data volume.

Figure 4:
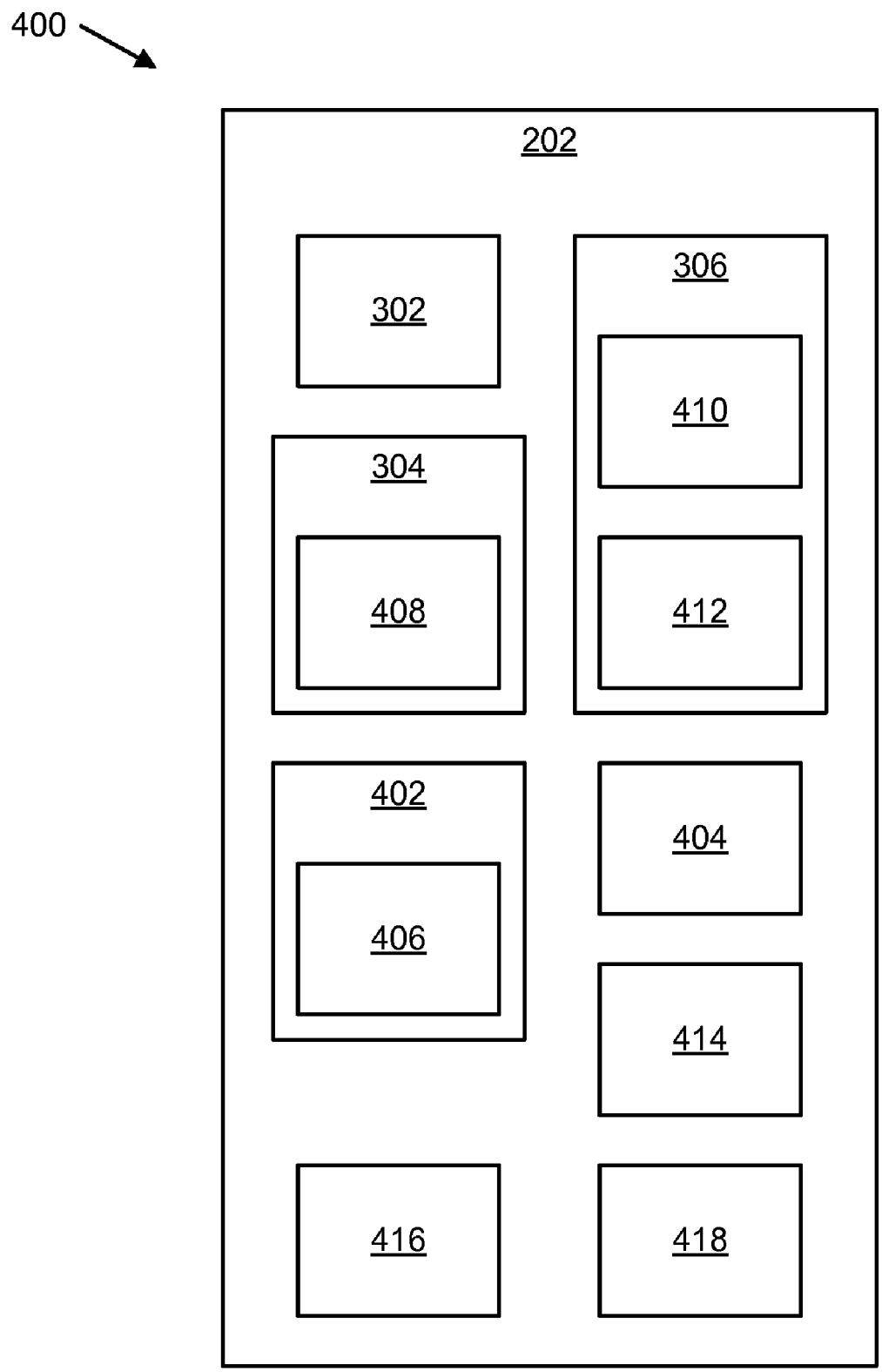
FIG. 4 is a schematic block diagram illustrating an alternate embodiment of an apparatus for an improved synchronous mirror swap in accordance with the present invention.

FIG. 4 is a schematic block diagram illustrating an alternate embodiment of an apparatus 400 for an improved synchronous mirror swap in accordance with the present invention. The apparatus 400 includes a host 202 with a C-A failback module 302, a B-C termination module 304, and a B-A-C storage module 306, which are substantially similar to the modules described in relation to the apparatus 300 of FIG. 3. In addition, the apparatus 400 includes a primary swap module 402 and a C-A forced failover module 404. In one embodiment, the primary swap module 402 includes an A-B termination module 406. In another embodiment, the B-C termination module 304 includes a track changes module 408. In another embodiment, the B-A-C storage module 306 includes an A-C tracking module 410 and a B-A incremental resync module 412. The apparatus 400 includes, in one embodiment, forced failback module 414, a B-C terminate module 416, and an A-B-C storage module 418. The modules are described below.

The apparatus 400 includes a primary swap module 402 that designates the second storage volume 210 as the primary storage volume in response to detecting a failure at a first storage volume 206. Initially, the first storage volume 206 is designated as the primary storage volume, the second storage volume 210 comprises a synchronous mirror copy of the first storage volume's data, and a third storage volume 214 comprises an asynchronous mirror copy of the second storage volume's data prior to the failure.

In one embodiment, the primary swap module 402 includes IBM's HyperSwap program. In another embodiment, the primary swap module 402 designates the second storage volume 210 as the primary storage volume automatically after detecting a failure in the first storage volume 206. In another embodiment, the primary swap module 402 designates the second storage volume 210 as the primary storage module with operator intervention. In one embodiment, the primary swap module 402 designates the first storage volume 206 as the primary storage volume after detecting a failure in the second storage volume 210. One of skill in the art will recognize other ways that the primary swap module 402 may designate a primary storage volume after detecting a failure.

In one embodiment, apparatus 400 includes a C-A forced failover module 404 that directs the third storage volume 214 to create a storage relationship and to track updates to the storage module after creating the storage relationship. The storage relationship includes information the third storage volume 214 uses to asynchronously store updates on the first storage volume 206. In one embodiment, the C-A forced failover module 404 is located on the second storage controller 211. In other embodiments, the C-A forced failover module 404 is located on the host 202 or other storage controllers 204, 220.

In general, the present invention includes a forced failover function and a forced failback function that are an improvement over the failover and failback commands of the prior art. The forced failover function allows the creation of a storage relationship associated with a storage volume that did not previously exist. For example, a typical storage relationship may exist between the first and second storage volumes 206, 210 to synchronously store updates on the second storage volume 210 from the first storage volume A failover command may be issued to instruct the second storage volume 210 to send updates to the first storage volume 206 after the first storage volume 206 is brought online after a failure. Once the first storage volume 206 is synchronized, a failback command is issued to direct the first storage volume 206 to store updates on the second storage volume 210 after the first storage volume 206 is again designated as the primary storage volume. A storage relationship directing the second storage volume 210 track updates received by the second storage volume 210 and then to store the tracked updates on the third storage volume 214 would not be possible with a prior art failover or failback command.

The forced failover function of the present invention allows a storage volume to establish a storage relationship with another storage volume that was not pre-defined during initialization. A forced failover function, in one embodiment, establishes a storage relationship with another storage volume but does not send updates. The storage volume instead creates an OOS bitmap to track changes that will be stored to the other storage volume. A forced failback function then starts updates flowing from the storage volume tracking the changes on the OOS bitmap to the other storage volume. In one embodiment, the forced failover function terminates any prior storage relationships of the storage volume.

The C-A forced failover module 404 is an example of the forced failover function of the present invention. For example, the third storage volume 214 has an asynchronous storage relationship with the second storage volume 210 and receives updates during normal operation. The C-A forced failover module 404 establishes a storage relationship with the first storage volume 206 on the third storage volume 214. Once the storage relationship is established, the third storage volume 214 starts to track changes received by the third storage volume 214 that will be sent to the first storage volume 206. In one embodiment, the changes are stored in an OOS bitmap. The OOS bitmap may be stored on the third storage controller 220. Without the forced failover function, the third storage volume 214 would be limited to receiving and sending updates to the second storage volume 210 and would not be able to establish a new storage relationship with the first storage volume 206 and track updates intended for the first storage volume 206.

The primary swap module 402, in one embodiment, includes an A-B termination module 406 that terminates a storage relationship on the first storage volume 206 in response to detecting a failure at a first storage volume 206 and making a second storage volume 210 a primary storage volume. The storage relationship includes information the second storage volume 210 uses to synchronously store data from the first storage volume 206. Terminating the storage relationship on the second storage volume 210, in one embodiment, allows the host 202 to designate the second storage volume 210 to be the primary storage volume and to send updates to the second storage volume 210.

In one embodiment, the B-C termination module 304 includes a track changes module 408 that tracks updates received by the second storage volume 210 after termination of sending updates from the second storage volume 210 to the third storage volume 214. Typically the track changes module 408 tracks changes in an incremental resync CR bitmap associated with the second storage volume 210. In one embodiment, the incremental resync CR bitmap is located on the second storage controller 211. The incremental resync CR bitmap created by the track changes module 408 allows the track changes module 408 to keep track of updates received after the B-C termination module 304 suspends updates from the second storage volume 210 to the third storage volume 214. Typically, the CR bitmap associated with the second storage volume 210 and used to track updates prior to the failure of the first storage volume 206 is not used after the new incremental resync CR bitmap is created.

In one embodiment, the B-A-C storage module 306 includes an A-C tracking module 410 that directs the first storage volume 206 to create a storage relationship on the first storage volume 206. A-C tracking module 410 directs the first storage volume 206 to create an OOS bitmap associated with the first storage volume 206 to track updates that will be copied to the third storage volume 214. Typically, the OOS bitmap is located on the first storage controller 204.

In another embodiment, the B-A-C storage module 306 includes a B-A incremental resync module 412 that directs the second storage volume 210 to create a storage relationship on the second storage volume 210. The storage relationship includes information the second storage volume 210 uses to synchronously store data on the first storage volume 206. The B-A incremental resync module 412 recreates the storage relationship on the second storage volume 210 that existed previous to the failure and was removed from the second storage volume 210 to allow the host 102 to send updates to the second storage volume 210.

Typically, the OOS bitmap associated with the second storage volume 210 that tracks updates made to the third storage volume 214 is drained before the B-C termination module 304 terminates updates from the second storage volume 210 to the third storage volume 214. After the OOS bitmap is drained, it is typically not used when the B-A incremental resync module 412 directs the second storage volume 210 to establish a storage relationship. The B-A incremental resync module 412, in one embodiment, directs the second storage controller 211 to merge the contents of the incremental resync CR bitmap created by the track changes module 408 into a new OOS bitmap that tracks updates copied to the first storage volume 206. In another embodiment, the B-A incremental resync module 412 directs the second storage controller 211 to merge the contents of the incremental resync CR bitmap created by the track changes module 408 into the existing OOS bitmap associated with the second storage volume 210 and the OOS bitmap tracks updates copied to the first storage volume 206. Once the first and second storage volumes 206, 210 are consistent, the OOS bitmap, in one embodiment, is not used.

The apparatus 400, in one embodiment, includes a C-B forced failback module 414 that directs the third storage volume 214 to store updates sent to the third storage volume 214 from the first storage volume 206 onto the second storage volume 210 in response to the first storage volume 206 being designated as the primary storage volume. The apparatus 400, in another embodiment, includes a B-C terminate module 416 that terminates sending updates from the first storage volume 206 to the third storage volume 214 in response to the second storage volume 210 becoming substantially consistent with the third storage volume 214. The apparatus 400, in yet another embodiment, includes an A-B-C storage module 418 that synchronously stores updates received by the first storage volume 206 onto the second storage volume 210 and asynchronously stores updates received by the second storage volume 210 onto the third storage volume 214 in response to terminating sending updates from the first storage volume 206 to the third storage volume 214.

Figure 5:
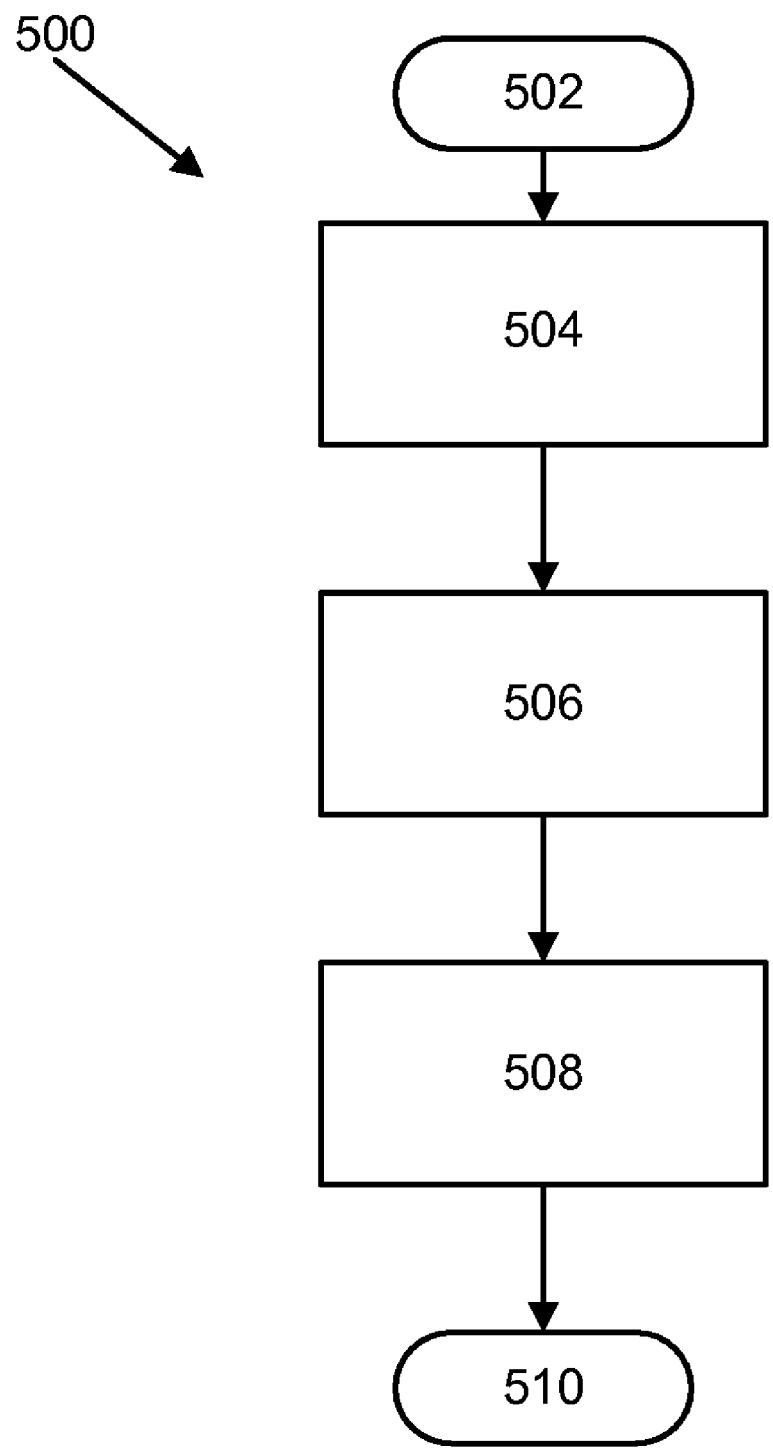
FIG. 5 is a schematic flow chart diagram illustrating one embodiment of a method for an improved synchronous mirror swap in accordance with the present invention.

FIG. 5 is a schematic flow chart diagram illustrating one embodiment of a method 500 for an improved synchronous mirror swap in accordance with the present invention. The method 500 begins 502 and the C-A failback module 302 directs 504 the third storage volume 214 to store updates sent to the third storage volume 214 from a second storage volume 210 onto a first storage volume 206 in response to the first storage volume 206 becoming operational after a failure. The C-A failback module 302, in one embodiment, direct the third storage volume 214 to issue a forced failover function creating a storage relationship on the third storage volume 214 with the first storage volume 206.

The B-C termination module 304 terminates 506 sending updates from the second storage volume 210 to the third storage volume 214, in response to the first storage volume 206 becoming substantially consistent with the third storage volume 214. Typically, the host 202 continues to send updates to the second storage volume 210 and the second storage volume 210 continues to send updates to the third storage volume 214 while the first storage volume 206 is brought to a consistent or nearly consistent state.

The B-A-C storage module 306 synchronously stores 508 updates received by the second storage volume 210 on the first storage volume 206 in response to the B-C termination module 304 terminating sending updates from the second storage volume 210 to the third storage volume 214. In addition, the B-C termination module 304 asynchronously stores 508 updates received by the first storage volume 206 on the third storage volume 214 in response to the B-C termination module 304 terminating sending updates from the second storage volume 210 to the third storage volume 214 and the method 500 ends 510.

The method 500, in one embodiment, provides a way to swap from a primary volume to a synchronous mirror volume while maintaining receiving updates to the second storage volume 210, which was previously a mirror copy of the failed first storage volume 206. The second storage volume 210 is the newly designated primary volume. The method 500 also allows synchronizing the first storage volume 206 after the first storage volume 206 returns to operation while maintaining the fourth storage volume 218 nearly consistent (as a result of the third storage volume 214 continuing to receive updates). Maintaining the second storage volume 210 as the primary storage volume may be desirable when the first and second storage volumes 206, 210 are located fairly close together or when there is little or no performance degradation by having the second storage volume 210 as the designated primary storage volume.

Figure 6:
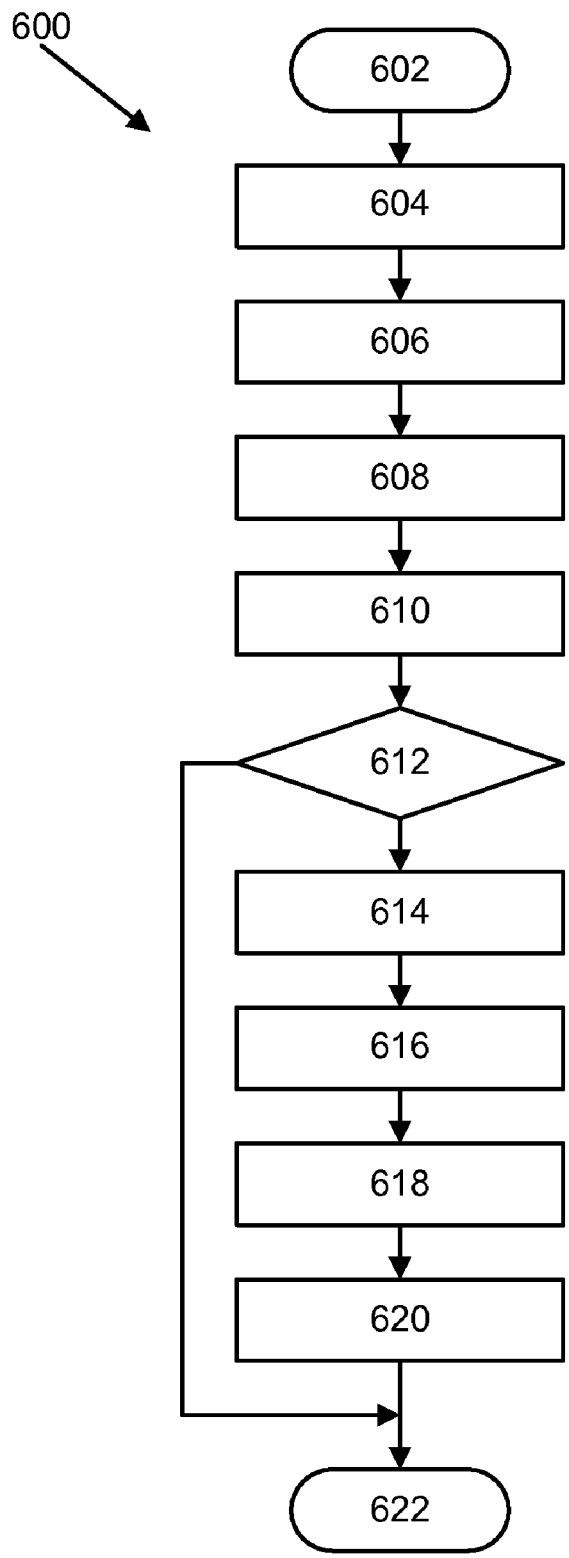
FIG. 6 is a schematic flow chart diagram illustrating an alternate embodiment of a method for an improved synchronous mirror swap in accordance with the present invention.

FIG. 6 is a schematic flow chart diagram illustrating an alternate embodiment of a method 600 for an improved synchronous mirror swap in accordance with the present invention. The method 600 provides a reverse procedure, using the same techniques used by the method 500 described in relation to in FIG. 5, to return a cascaded data storage system 200 to its original architecture with the first storage volume 206 as the primary storage volume, the second storage volume 210 synchronously receiving updates from the first storage volume 206, and the third storage volume 214 asynchronously receiving updates from the second storage volume 210. The method 600 may be desirable when the intermediate storage site with the second storage volume 210 is farther from the host 202 than the first storage volume 206 or has a slower connection to the host 202 than the first storage volume 206.

The method 600 begins 602 the primary swap module 402 a primary swap module designates 604 the second storage volume 210 as a primary storage volume in response to detecting a failure at the first storage volume 206. The first storage volume 206 is designated as the primary storage volume, the second storage volume 210 comprises a synchronous mirror copy of the first storage volume's data, and the third storage volume 214 comprises an asynchronous mirror copy of the second storage volume's data prior to the failure. The C-A failback module 302 directs 606 the third storage volume 214 to store updates sent to the third storage volume 214 from a second storage volume 210 onto a first storage volume 206 in response to the first storage volume 206 becoming operational after a failure.

The B-C termination module 304 terminates 608 sending updates from the second storage volume 210 to the third storage volume 214, in response to the first storage volume 206 becoming substantially consistent with the third storage volume 214. The B-A-C storage module 306 synchronously stores 610 updates received by the second storage volume 210 on the first storage volume 206 and the B-C termination module 304 asynchronously stores 610 updates received by the first storage volume 206 on the third storage volume 214 in response to the B-C termination module 304 terminating sending updates from the second storage volume 210 to the third storage volume 214.

The primary swap module 402 determines 612 if the first storage volume 206 is to be the primary storage volume. If not, the method 600 ends 622. If primary swap module 402 determines 612 that the first storage volume 206 is to be the primary storage volume, the primary swap module 402 designates 614 the first storage volume 206 as the primary storage volume. The C-B forced failback module 414 directs 616 a third storage volume 214 to store updates sent to the third storage volume 214 from the first storage volume 206 onto the second storage volume 210 in response to the first storage volume 206 being designated as the primary storage volume.

The B-C terminate module 416 terminates 618 sending updates from the first storage volume 206 to the third storage volume 214 in response to the second storage volume 210 becoming substantially consistent with the third storage volume 214. The A-B-C storage module 418 synchronously stores 620 updates received by the first storage volume 206 on the second storage volume 210 and asynchronously stores updates received by the second storage volume 210 on the third storage volume 214 in response to terminating sending updates from the first storage volume 206 to the third storage volume 214 and the method 600 ends 622.

FIGS. 7A to 7K are schematic block diagrams illustrating one embodiment of a data system 200 for an improved synchronous mirror swap in accordance with the present invention. FIGS. 7A to 7K show steps in accordance with the present invention to reconfigure the data system 200 to achieve a mirror data volume being designated as a primary storage volume after failure of a primary storage volume.

Figure 7A:
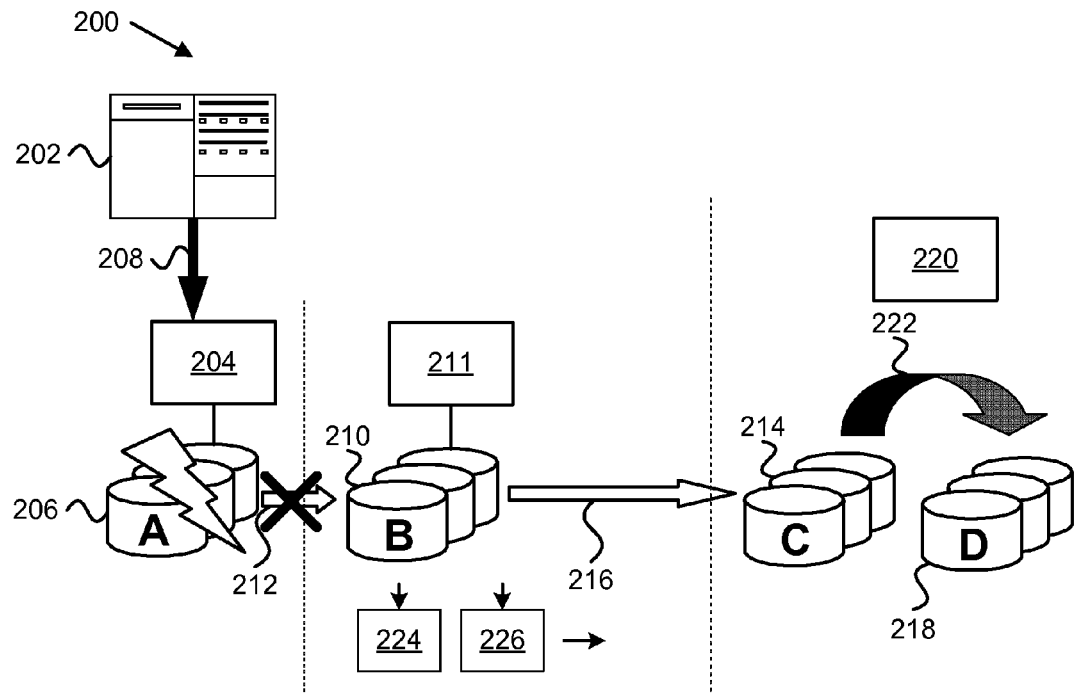
FIG. 7A is a schematic block diagram illustrating one embodiment of a data system for an improved synchronous mirror swap in accordance with the present invention after a primary storage volume failure.
Figure 7B:
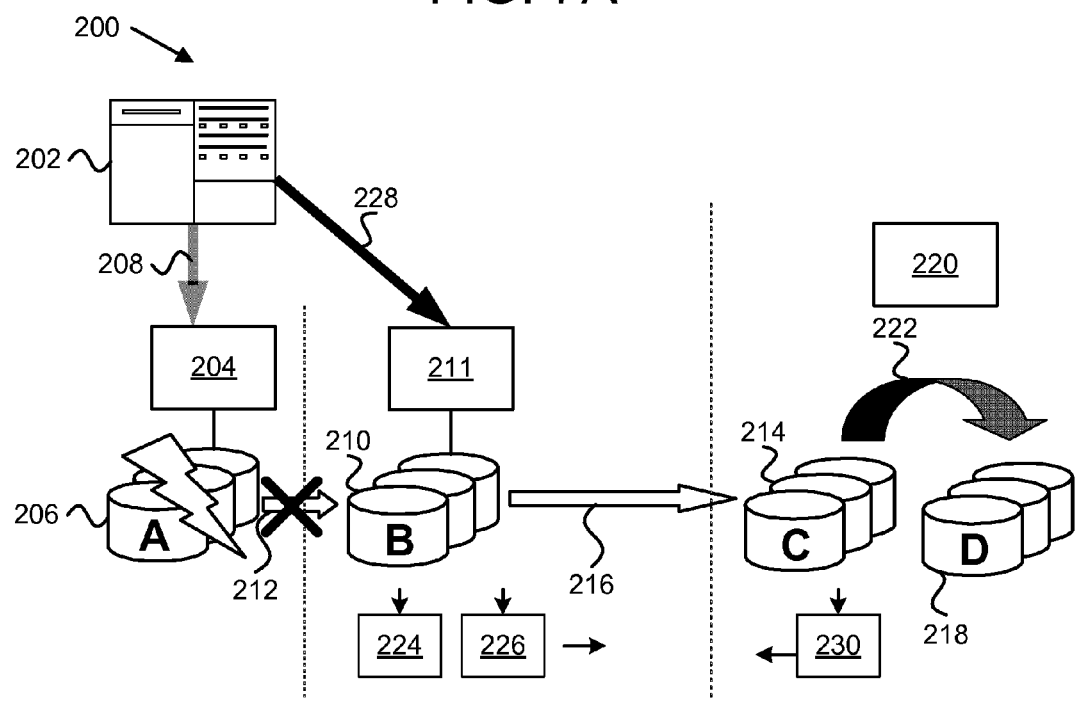
FIG. 7B is a schematic block diagram illustrating one embodiment of a data system for an improved synchronous mirror swap in accordance with the present invention where a second storage volume becomes the primary storage volume.

FIG. 7A depicts the system 200 described in relation FIG. 2 with the first storage volume 206 in a failed state. Typically, the failure interrupts synchronous data flow along the connection 212 between the first storage volume 206 and the second storage volume 210. The primary swap module 402 designates the second storage volume 210 as the primary storage volume after detecting the failure (FIG. 7B). In one embodiment, the A-B termination module 406 terminates the storage relationship on the second storage volume 210 with the first storage volume 206. This embodiment allows the primary swap module 402 to designate the second storage volume 210 as the primary storage module and the host 202 to send updates to the second storage volume 210 over a connection 228 between the host 202 and the second storage volume 210.

The C-A forced failover module 404 directs the third storage volume 214 to establish a storage relationship on the third storage volume 214. A failover command establishes on the third storage volume 214 a relationship between the third and first storage volumes 214, 206 for the third storage volume 214 to send updates to the first storage volume 206. Typically, the first storage volume 206 is not operational at this point so the forced failover module directs the third storage volume 214 (through third storage controller 220) to create an OOS bitmap 230 to track changes on the third storage volume 214 that will be copied to the first storage volume 206.

Figure 7C:
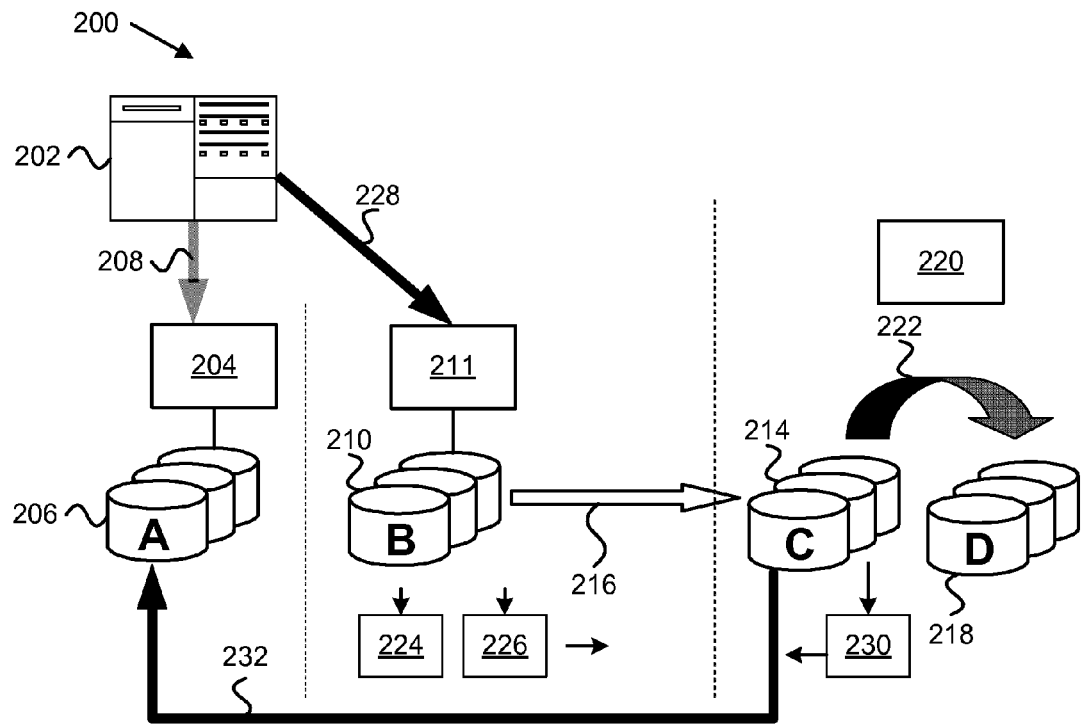
FIG. 7C is a schematic block diagram illustrating one embodiment of a data system for an improved synchronous mirror swap in accordance with the present invention with a link established for sending updates from a third storage volume to a first storage volume.

The C-A forced failover module 404 directs the third storage controller 220 to issue a forced failback function to start updates from the third storage volume 214 to the first storage volume 206 (see FIG. 7C). Once the first storage volume 206 has recovered, the updates are sent over a connection 232 between the third and first storage volumes 214, 206. Typically the updates are copied asynchronously. In one embodiment, the contents of the OOS bitmap associated with the first storage volume 206 (not shown) are obtained, if possible, to resync changes that may have occurred during failure. The system 200 may then continue to operate, with updates from the host 202 flowing to the second storage volume 210 and the second storage volume 210 sending updates asynchronously to the third storage volume 214 while the third storage volume 214 updates the first storage volume 206.

Figure 7D:
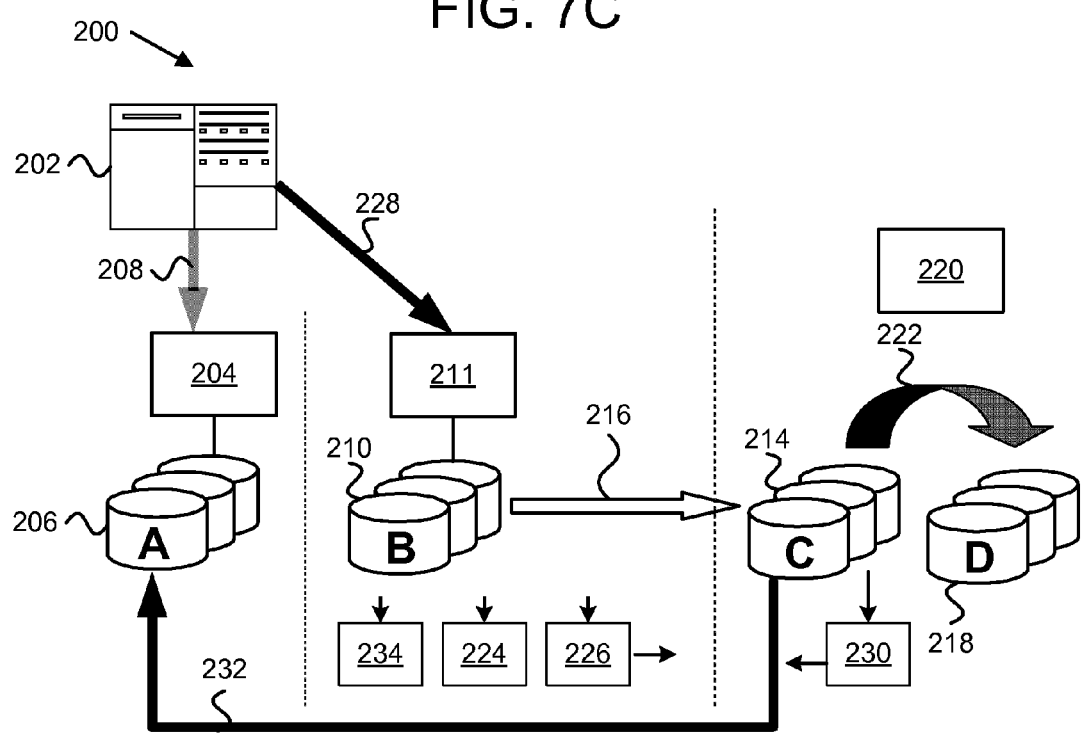
FIG. 7D is a schematic block diagram illustrating one embodiment of a data system for an improved synchronous mirror swap in accordance with the present invention depicting an incremental resync change recording bitmap.
Figure 7E:
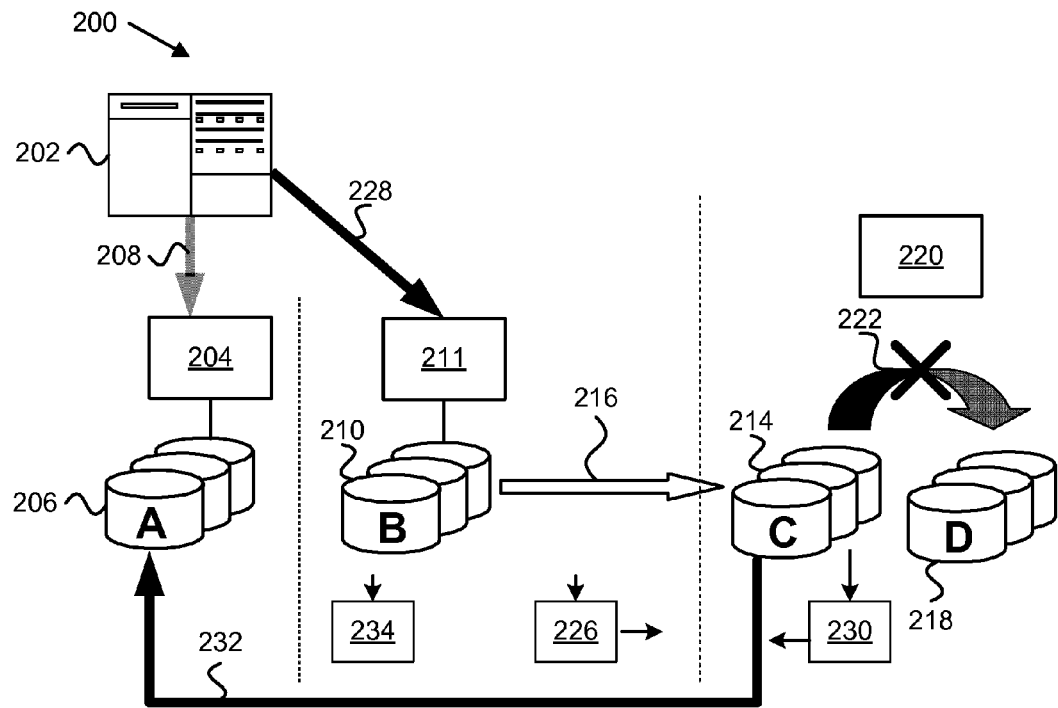
FIG. 7E is a schematic block diagram illustrating one embodiment of a data system for an improved synchronous mirror swap in accordance with the present invention depicting termination of updates to a fourth storage volume.

In one embodiment, when the first storage volume 206 is nearly synchronized, the track changes module 408 creates an incremental resync CR bitmap 234 on the second storage controller 211 to track updates that will be received by the second storage volume 210 after updates cease to the third storage volume 214 (see FIG. 7D). Eventually the updates on the original CR bitmap 224 associated with the second storage volume 210 will be transferred to the second storage volume's OOS bitmap 226 and the original CR bitmap 224 is inactive (depicted in FIG. 7E as not being present). In preparation for the updates ceasing from the second storage volume 210 to the third storage volume 214, updates are halted by the third storage controller 220 to the fourth storage volume 218 and the fourth storage volume 218 starts to age.

Figure 7F:
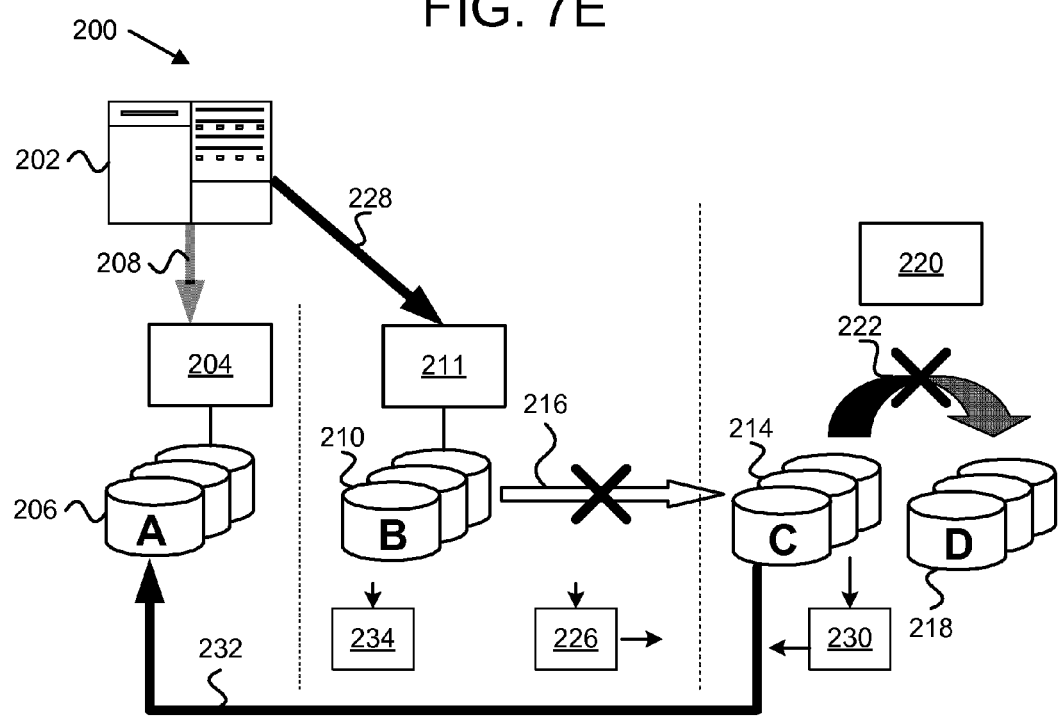
FIG. 7F is a schematic block diagram illustrating one embodiment of a data system for an improved synchronous mirror swap in accordance with the present invention depicting termination of updates from the second storage volume to the third storage volume.
Figure 7G:
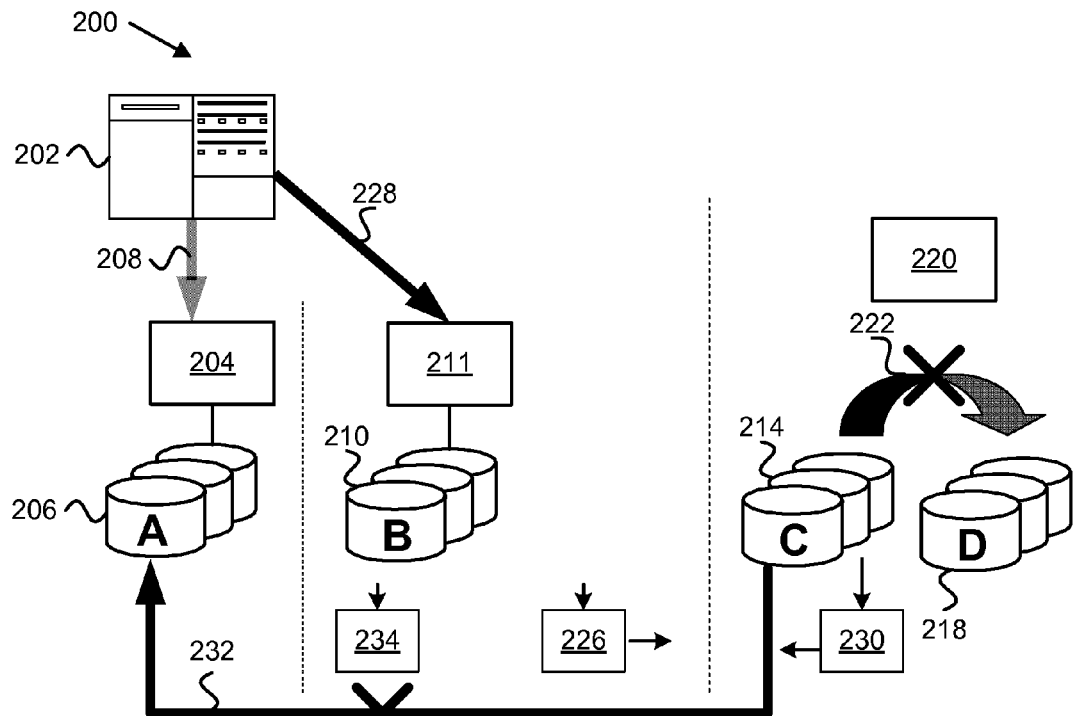
FIG. 7G is a schematic block diagram illustrating one embodiment of a data system for an improved synchronous mirror swap in accordance with the present invention depicting termination of updates from the third storage volume to the first storage volume.

The B-C termination module 304 then terminates updates from the second storage volume 210 to the third storage volume 214 (see FIG. 7F). The B-C termination module 304 also terminates the second to third storage volume relationship from the third storage volume 214. Updates continue to flow to the first storage volume 206 until the OOS bitmap 230 associated with the third storage volume 214 is cleared. The first and third storage volume 206 and 214 typically are consistent at this point. Updates to from the third storage volume 214 to the first storage volume 206 are then suspended (see FIG. 7G).

Figure 7H:
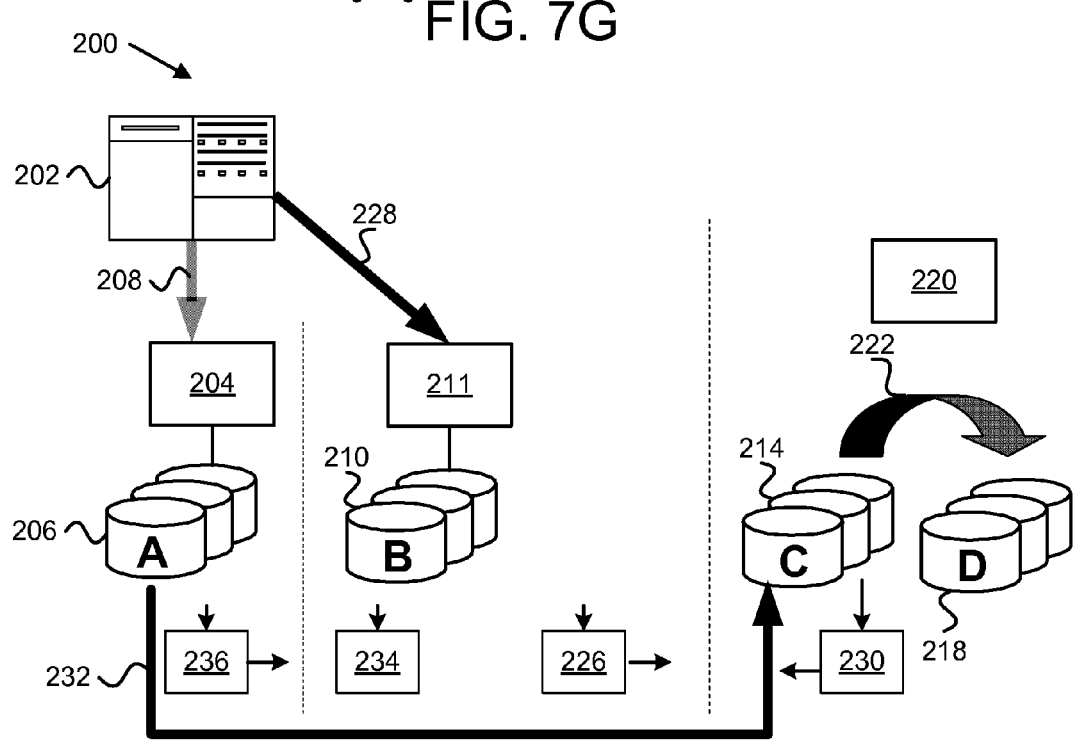
FIG. 7H is a schematic block diagram illustrating one embodiment of a data system for an improved synchronous mirror swap in accordance with the present invention depicting a connection for sending updates from the first storage volume to the third storage volume.

The A-C forced failover module 410 directs the first storage volume 206 to create an OOS bitmap 236 to track updates copied to the third storage volume 214 (see FIG. 7H). The B-A-C storage module 306 issues a failback command and the first storage volume 206 starts to asynchronously update the third storage volume 214 (see FIG. 7H).

Figure 7I:
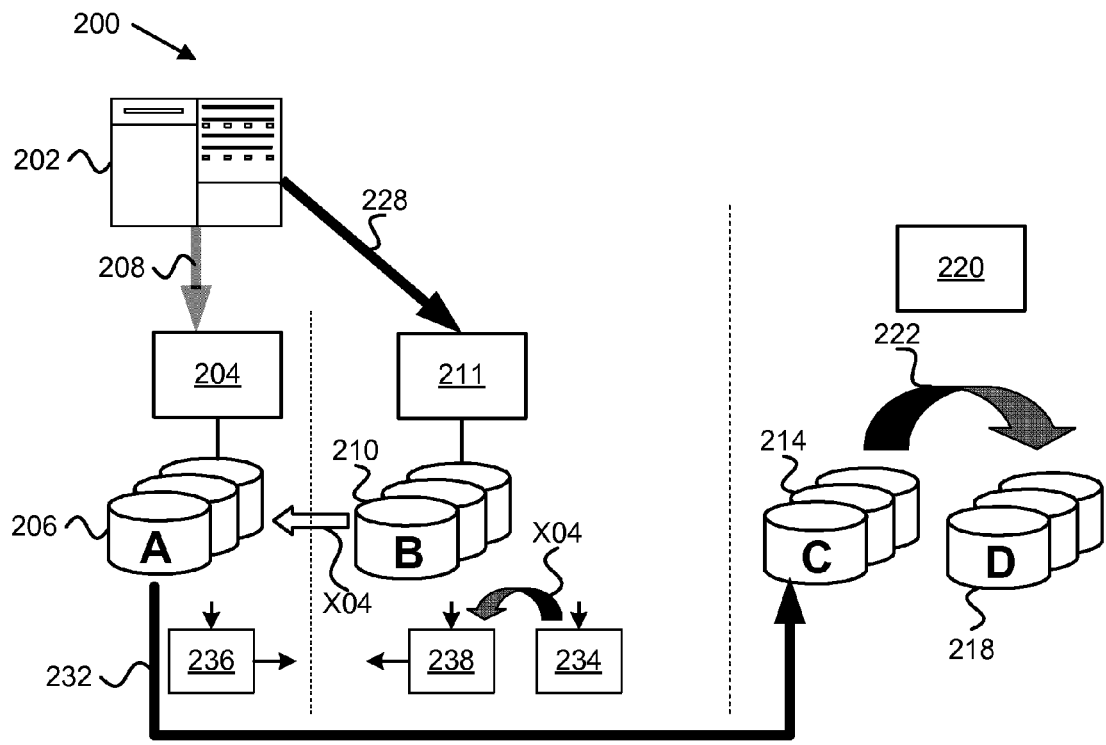
FIG. 7I is a schematic block diagram illustrating one embodiment of a data system for an improved synchronous mirror swap in accordance with the present invention depicting a synchronous connection for sending updates from the second storage volume to the third storage volume.

The B-A incremental resync module 412 directs the second storage volume 210 to establish a synchronous storage relationship on the second storage volume 210 to send updates to the first storage volume 206 (see FIG. 7I). If the first storage volume 206 does not have a relationship with the second storage volume 210, the B-A incremental resync module 412 directs the first storage volume 206 to establish a relationship to receive updates from the second storage volume 210. In one embodiment, the second storage controller 211 merges the contents of the incremental resync CR bitmap 234 into a new OOS bitmap 238 to track updates copied to the first storage volume 206. In another embodiment, the second storage controller 211 merges the contents of the incremental resync CR bitmap 234 into the existing, unused OOS bitmap 226 (not shown on FIG. 7I).

Figure 7J:
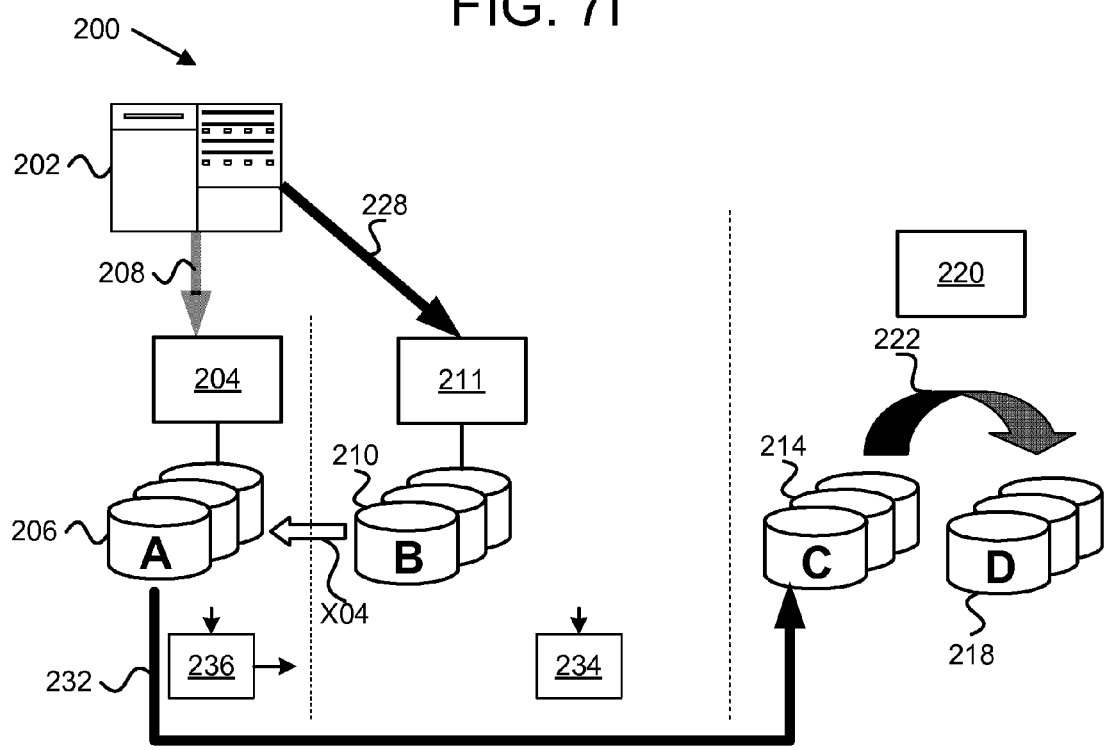
FIG. 7J is a schematic block diagram illustrating one embodiment of a data system for an improved synchronous mirror swap in accordance with the present invention depicting waiting for the volumes to become synchronized.
Figure 7K:
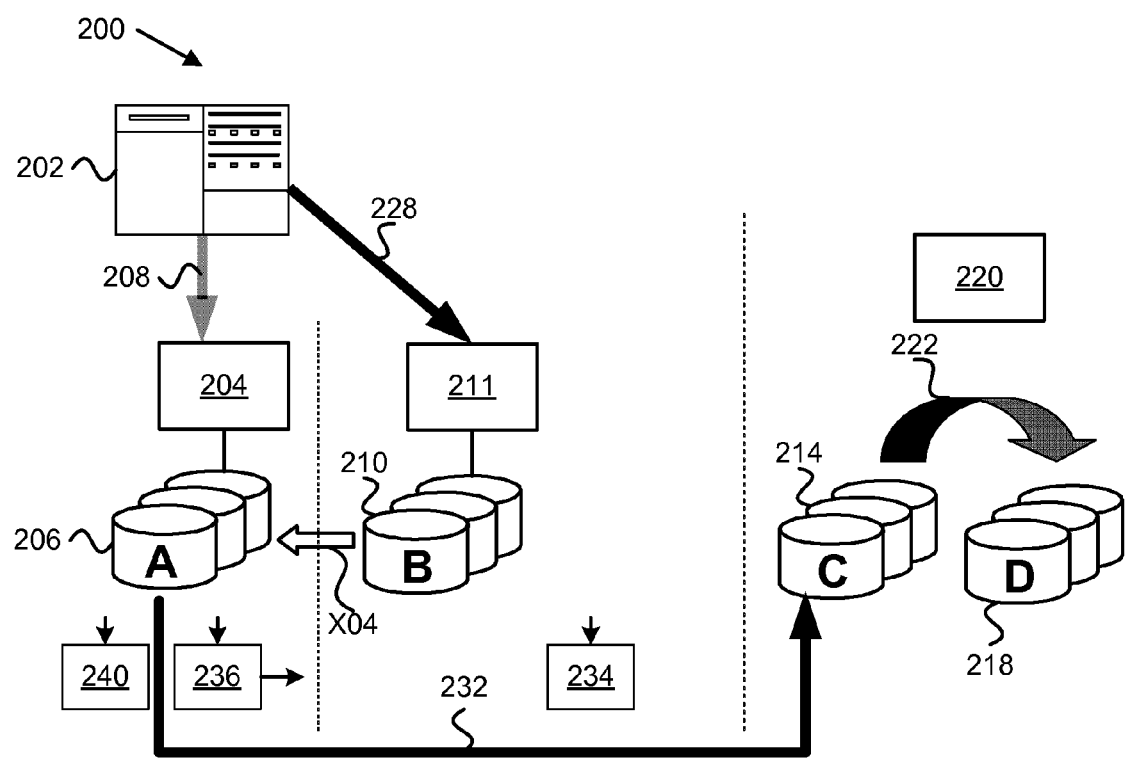
FIG. 7K is a schematic block diagram illustrating one embodiment of a data system for an improved synchronous mirror swap in accordance with the present invention depicting re-establishing asynchronous write operations between the first, third, and fourth volumes.

Once the contents of the OOS bitmap 238 associated with the second storage volume 210 are cleared, typically the first and second storage volumes 206, 210 are consistent and the OOS bitmap 238 is inactive (depicted as not present on FIG. 7J). A CR bitmap 240 is created (or reactivated) on the first storage volume 206 and the B-A-C storage volume directs the first storage volume 206 to asynchronously send updates to the third storage volume 214. As updates are received, the third storage controller 220 updates the fourth storage volume 218 using a flash copy process (see FIG. 7K).

The system 200 is now configured in a cascaded data storage configuration with data flowing from the host 202 to the second storage volume 210, synchronously to the first storage volume 206, asynchronously to the third storage volume 214. The updates are chronologically arranged on the fourth storage volume 218. Where the first storage volume 206 is desired to be the primary storage volume, the process is repeated and the primary volume is swapped from the second storage volume 210 to the first storage volume 206. Beneficially, the process depicted in FIG. 7, along with the methods 500, 600 and apparatuses 300, 400 described herein allow for a primary volume swap and return where the third/fourth storage volumes 214, 218 are kept nearly synchronous while the first storage volume 206 is resynchronized. In addition, updates continue to flow from the host 202 to the second storage volume 210 and from the second storage volume 210 to the third storage volume 214.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer program product comprising a computer readable medium having computer usable program code programmed for activating a synchronous mirror as a primary storage volume, the operations of the computer program product comprising:

directing a third storage volume to store updates sent to the third storage volume from a second storage volume onto a first storage volume in response to the first storage volume becoming operational after a failure;

terminating sending updates from the second storage volume to the third storage volume in response to the first storage volume becoming substantially consistent with the third storage volume; and synchronously storing updates received by the second storage volume on the first storage volume and asynchronously storing updates received by the first storage volume on the third storage volume in response to terminating sending updates from the second storage volume to the third storage volume after the first and third storage volumes are substantially consistent.

2. The computer program product of claim 1, further comprising designating the second storage volume as a primary storage volume in response to detecting the failure at the first storage volume, wherein the first storage volume is designated as the primary storage volume, the second storage volume comprises a synchronous mirror copy of the first storage volume's data, and the third storage volume comprises an asynchronous mirror copy of the second storage volume's data prior to the failure.

3. The computer program product of claim 2, further comprising terminating a storage relationship on the second storage volume, the storage relationship comprising information the second storage volume uses to synchronously store data from the first storage volume.

4. The computer program product of claim 2, further comprising:

designating the first storage volume as the primary storage volume in response to synchronously storing updates received by the second storage volume on the first storage volume and asynchronously storing updates received by the first storage volume on the third storage volume;

directing the third storage volume to store updates sent to the third storage volume from the first storage volume onto the second storage volume in response to the first storage volume being designated as the primary storage volume;

terminating sending updates from the first storage volume to the third storage volume in response to the second storage volume becoming substantially consistent with the third storage volume; and synchronously storing updates received by the first storage volume on the second storage volume and asynchronously storing updates received by the second storage volume on the third storage volume in response to terminating sending updates from the first storage volume to the third storage volume.

5. The computer program product of claim 1, wherein directing the third storage volume to store updates sent to the third storage volume from the second storage volume onto the first storage volume further comprises directing the third storage volume to create a storage relationship and to track updates subsequently received by the third storage volume, the storage relationship comprising information the third storage volume uses to asynchronously store updates on the first storage volume.

6. The computer program product of claim 1, wherein terminating sending updates from the second storage volume to the third storage volume further comprises removing a storage relationship from the second storage volume and the third storage volume, the storage relationship comprising information the second storage volume uses to store data on the third storage volume.

7. The computer program product of claim 1, wherein terminating sending updates from the second storage volume to the third storage volume further comprises tracking updates received by the second storage volume after termination of sending updates from the second storage volume to the third storage volume.

8. The computer program product of claim 1, wherein asynchronous storing updates on the third storage volume further comprises updating a fourth storage volume from the third storage volume using a flash copy process, wherein updates are chronologically organized on the fourth storage volume.

9. The computer program product of claim 8, wherein the fourth storage volume comprises data suitable for reinitializing a primary storage volume.

10. The computer program product of claim 8, wherein terminating sending updates from the second storage volume to the third storage volume further comprises terminating updates to the fourth storage volume.

11. The computer program product of claim 8, wherein asynchronously storing updates received by the first storage volume on the third storage volume further comprises restarting updates to the fourth storage volume.

12. The computer program product of claim 1, wherein asynchronously storing updates received by the first storage volume on the third storage volume further comprises tracking updates received by the first storage volume to be copied to the third storage volume.

13. The computer program product of claim 1, wherein synchronously storing updates received by the second storage volume on the first storage volume further comprises directing the second storage volume to create a storage relationship on the second storage volume, the storage relationship comprising information the second storage volume uses to synchronously store data on the first storage volume.

14. An apparatus to activate a synchronous mirror as a primary storage volume, the apparatus comprising:

a primary swap module configured to designate a second storage volume as a primary storage volume in response to detecting a failure at a first storage volume, wherein the first storage volume is designated as the primary storage volume, the second storage volume comprises a synchronous mirror copy of the first storage volume's data, and a third storage volume comprises an asynchronous mirror copy of the second storage volume's data prior to the failure;
a C-A failback module configured to direct the third storage volume to store updates sent to the third storage volume from the second storage volume onto the first storage volume in response to the first storage volume becoming operational after the failure;
a B-C termination module configured to terminate sending updates from the second storage volume to the third storage volume in response to the first storage volume becoming substantially consistent with the third storage volume; and
a B-A-C storage module configured to synchronously store updates received by the second storage volume on the first storage volume and asynchronously store updates received by the first storage volume on the third storage volume in response to the B-C termination module terminating sending updates from the second storage volume to the third storage volume;
wherein the primary swap module, C-A failback module, B-C termination module, and B-A-C storage module each comprises at least one of logic hardware and executable code, the executable code being stored on one or more computer readable media.

15. The apparatus of claim 14, further comprising a C-A forced failover module configured to direct the third storage volume to create a storage relationship and to track updates received by the third storage volume subsequent creation of the storage relationship, the storage relationship comprising information the third storage volume uses to asynchronously store updates on the first storage volume.

16. The apparatus of claim 14, wherein the primary swap module further comprises an A-B termination module configured to terminate a storage relationship on the second storage volume and on the third storage volume in response to detecting a failure at the first storage volume and making the second storage volume a primary storage volume, the storage relationship comprising information the second storage volume uses to synchronously store data from the first storage volume.

17. The apparatus of claim 14, wherein the B-C termination module is further configured to remove a storage relationship from the second storage volume, the storage relationship comprising information the second storage volume uses to store data on the third storage volume.

18. The apparatus of claim 14, wherein the B-C termination module further comprises a track changes module configured to track updates received by the second storage volume after termination of sending updates from the second storage volume to the third storage volume.

19. The apparatus of claim 14, further comprising a fourth storage volume and wherein the third storage volume is configured to store updates to the fourth storage volume using a flash copy process, wherein the updates are chronologically organized on the fourth storage volume.

20. The apparatus of claim 19, wherein the B-C termination module is further configured to terminate updates to the fourth storage volume.

21. The apparatus of claim 19, wherein the B-A-C storage module is further configured to restart updates to the fourth storage volume.

22. The apparatus of claim 14, wherein the B-A-C storage module further comprises an A-C tracking module configured to direct the first storage module to track updates received by the first storage volume to be copied to the third storage volume.

23. The apparatus of claim 14, wherein the B-A-C storage module further comprises a B-A incremental resync module configured to direct the second storage volume to create a storage relationship on the second storage volume, the storage relationship comprising information the second storage volume uses to synchronously store data on the first storage volume.

24. A system to activate a synchronous mirror as a primary storage volume, the system comprising:
a first storage volume designated as a primary storage volume prior to a failure of the first storage volume;
a second storage volume comprising a synchronous mirror copy of the first storage volume's data prior to the failure;
a third storage volume comprising an asynchronous mirror copy of the second storage volume's data prior to the failure;
a host configured to store updates to the first storage volume and the second storage volume, the host comprising:
a primary swap module configured to designate the second storage volume as the primary storage volume in response to detecting the failure at the first storage volume;
a C-A failback module configured to direct the third storage volume to store updates sent to the third storage volume from the second storage volume onto the first storage volume in response to the first storage volume becoming operational after the failure;
a B-C termination module configured to terminate sending updates from the second storage volume to the third storage volume in response to the first storage volume becoming nearly consistent with the third storage volume; and
a B-A-C storage module configured to synchronously store updates received by the second storage volume on the first storage volume and asynchronously store updates received by the first storage volume on the third storage volume in response to terminating sending updates from the second storage volume to the third storage volume.

25. The system of claim 24, further comprising a fourth storage volume located with the third storage volume, the third storage volume configured to store updates to the fourth storage volume using a flash copy process, wherein the updates are chronologically organized on the fourth storage volume.

26. The system of claim 25, wherein the host is further configured to initialize one of the first storage volume and the second storage volume with the contents of the third storage volume in response to a failure, wherein the contents of the third storage volume are copied from the second storage volume.

27. A method for deploying software to activate a synchronous mirror as a primary storage volume, the method comprising:
determining customer synchronous mirror and asynchronous mirror configuration and reliability requirements; and
executing synchronous mirror activation computer code, the computer code configured to
designate a second storage volume as a primary storage volume in response to detecting a failure at a first storage volume, wherein the first storage volume is designated as the primary storage volume, the second storage volume comprises a synchronous mirror copy of the first storage volume's data, and a third storage volume comprises an asynchronous mirror copy of the second storage volume's data prior to the failure;

direct the third storage volume to store updates sent to the third storage volume from the second storage volume onto the first storage volume in response to the first storage volume becoming operational after the failure;

terminate sending updates from the second storage volume to the third storage volume in response to the first storage volume becoming substantially consistent with the third storage volume; and synchronously store updates received by the second storage volume on the first storage volume and asynchronously store updates received by the first storage volume on the third storage volume in response to terminating sending updates from the second storage volume to the third storage volume after the first and third storage volumes are substantially consistent.

28. An apparatus to activate a synchronous mirror as a primary storage volume, the apparatus comprising:

means for designating a second storage volume as a primary storage volume in response to detecting a failure at a first storage volume, wherein the first storage volume is designated as the primary storage volume, the second storage volume comprises a synchronous mirror copy of the first storage volume's data, and a third storage volume comprises an asynchronous mirror copy of the second storage volume's data prior to the failure;

means for directing the third storage volume to store updates sent to the third storage volume from the second storage volume onto the first storage volume in response to the first storage volume becoming operational after the failure;

means for terminating sending updates from the second storage volume to the third storage volume in response to the first storage volume becoming substantially consistent with the third storage volume; and means for synchronously storing updates received by the second storage volume on the first storage volume and asynchronously storing updates received by the first storage volume on the third storage volume in response to terminating sending updates from the second storage volume to the third storage volume after the first and third storage modules are substantially consistent.

* * * * *

UNITED STATES PATENT AND TRADEMARK OFFICE
CERTIFICATE OF CORRECTION

PATENT NO. : 7,627,729 B2  Page 1 of 1
APPLICATION NO. : 11/470970
DATED : December 1, 2009
INVENTOR(S) : Bartfai et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 413 days.

Signed and Sealed this

Second Day of November, 2010

David J. Kappos
*Director of the United States Patent and Trademark Office*